United States Patent
Shaver et al.

(10) Patent No.: US 10,094,306 B2
(45) Date of Patent: Oct. 9, 2018

(54) NONLINEAR MODEL-BASED CONTROLLER FOR PREMIXED CHARGE COMPRESSION IGNITION COMBUSTION TIMING IN DIESEL ENGINES

(71) Applicant: Purdue Research Foundation, West Lafayette, IN (US)

(72) Inventors: Gregory M. Shaver, Lafayette, IN (US); Lyle E. Kocher, Whiteland, IN (US); Carrie Hall, Chicago, IL (US); Daniel Van Alstine, Lafayette, IN (US); Mark Magee, Columbus, IN (US)

(73) Assignee: Purdue Research Foundation, West Lafayette, IN (US)

( * ) Notice: Subject to any disclaimer, the term of this patent is extended or adjusted under 35 U.S.C. 154(b) by 101 days.

(21) Appl. No.: 14/651,521

(22) PCT Filed: Dec. 12, 2013

(86) PCT No.: PCT/US2013/074709
§ 371 (c)(1),
(2) Date: Jun. 11, 2015

(87) PCT Pub. No.: WO2014/093643
PCT Pub. Date: Jun. 19, 2014

(65) Prior Publication Data
US 2015/0330326 A1    Nov. 19, 2015

Related U.S. Application Data

(60) Provisional application No. 61/784,204, filed on Mar. 14, 2013, provisional application No. 61/736,346, filed on Dec. 12, 2012.

(51) Int. Cl.
*F02D 35/02*    (2006.01)
*F02D 41/00*    (2006.01)
(Continued)

(52) U.S. Cl.
CPC .............. *F02D 35/02* (2013.01); *F02B 1/12* (2013.01); *F02D 13/0226* (2013.01);
(Continued)

(58) Field of Classification Search
CPC .. F02D 35/02; F02D 13/0265; F02D 13/0226; F02D 41/0062; F02D 41/3035;
(Continued)

(56) References Cited

U.S. PATENT DOCUMENTS 3,941,113 A * 3/1976 Baguelin ................. F02B 1/06
                                                     123/179.1
5,832,880 A    11/1998 Dickey
(Continued)

FOREIGN PATENT DOCUMENTS

WO    9942718    8/1999
WO    0159285    8/2001
WO    2011053819    5/2011

*Primary Examiner* — Joseph Dallo
(74) *Attorney, Agent, or Firm* — John V. Daniluck; Bingham Greenebaum Doll LLP

(57) ABSTRACT

Advanced combustion modes, such as PCCI, operate near the system stability limits. In PCCI, the combustion event begins without a direct combustion trigger in contrast to traditional spark-ignited gasoline engines and direct-injected diesel engines. The lack of a direct combustion trigger encourages the usage of model-based controls to provide robust control of the combustion phasing. The nonlinear relationships between the control inputs and the combustion system response often limit the effectiveness of traditional, non-model-based controllers. Accurate knowledge of the system states and inputs is helpful for implementation of an effective nonlinear controller. A nonlinear controller is developed and implemented to control the engine combustion timing during diesel PCCI operation by targeting (Continued)

desired values of the in-cylinder oxygen concentration, pressure, and temperature during early fuel injection.

39 Claims, 11 Drawing Sheets

(51) Int. Cl.
| | |
|---|---|
| *F02D 41/14* | (2006.01) |
| *F02D 41/30* | (2006.01) |
| *F02D 41/40* | (2006.01) |
| *F02B 1/12* | (2006.01) |
| *F02D 13/02* | (2006.01) |
| *F02M 26/05* | (2016.01) |
| *F02M 26/10* | (2016.01) |
| *F02M 26/23* | (2016.01) |

(52) U.S. Cl.
CPC ..... *F02D 13/0265* (2013.01); *F02D 41/0007* (2013.01); *F02D 41/0062* (2013.01); *F02D 41/0072* (2013.01); *F02D 41/1401* (2013.01); *F02D 41/1447* (2013.01); *F02D 41/1458* (2013.01); *F02D 41/3035* (2013.01); *F02D 41/401* (2013.01); F02D 2041/1415 (2013.01); F02D 2041/1416 (2013.01); F02D 2041/1433 (2013.01); F02D 2200/0402 (2013.01); F02D 2200/0406 (2013.01); F02D 2200/0411 (2013.01); F02D 2200/0414 (2013.01); *F02M 26/05* (2016.02); *F02M 26/10* (2016.02); *F02M 26/23* (2016.02); Y02T 10/128 (2013.01); Y02T 10/144 (2013.01); Y02T 10/18 (2013.01); Y02T 10/44 (2013.01); Y02T 10/47 (2013.01)

(58) Field of Classification Search
CPC ............... F02D 41/401; F02D 41/0072; F02D 41/0007; F02D 41/1401; F02D 41/1447; F02D 41/1458; F02B 1/12; F02M 26/05; F02M 26/10
See application file for complete search history.

(56) References Cited

U.S. PATENT DOCUMENTS

| | | | |
|---|---|---|---|
| 6,105,555 A | 8/2000 | Weber et al. | |
| 6,230,683 B1 | 5/2001 | zur Loye et al. | |
| 6,276,334 B1 | 8/2001 | Flynn et al. | |
| 6,286,482 B1 | 9/2001 | Flynn et al. | |
| 6,561,157 B2 | 5/2003 | zur Loye et al. | |
| 6,698,394 B2 | 3/2004 | Thomas | |
| 6,907,870 B2 | 6/2005 | zur Loye et al. | |
| 6,912,992 B2 | 7/2005 | Ancimer et al. | |
| 6,925,971 B1* | 8/2005 | Peng | F02B 25/06 123/46 R |
| 7,036,482 B2 | 5/2006 | Beck et al. | |
| 7,121,254 B2 | 10/2006 | Wickman et al. | |
| 7,398,743 B2 | 7/2008 | Fiveland | |
| 7,887,695 B2 | 2/2011 | Erwin et al. | |
| 8,494,757 B2 | 7/2013 | Haskara et al. | |
| 8,813,690 B2 | 8/2014 | Kumar et al. | |
| 2001/0042372 A1* | 11/2001 | Khair | F01N 3/0275 60/278 |
| 2003/0052041 A1 | 3/2003 | Erwin et al. | |
| 2003/0226538 A1* | 12/2003 | Eckerle | F02B 23/0651 123/298 |
| 2006/0000457 A1* | 1/2006 | Huang | F01L 1/34 123/568.14 |
| 2006/0070603 A1* | 4/2006 | Stanton | F02B 23/0651 123/298 |
| 2006/0112928 A1 | 6/2006 | Coleman et al. | |
| 2009/0048762 A1* | 2/2009 | Kang | F02M 26/01 701/103 |
| 2009/0143959 A1* | 6/2009 | Yamaoka | F02D 41/0002 701/108 |
| 2013/0104543 A1 | 5/2013 | Zoldak et al. | |
| 2014/0060506 A1* | 3/2014 | Shaver | F02D 13/0226 123/672 |

* cited by examiner

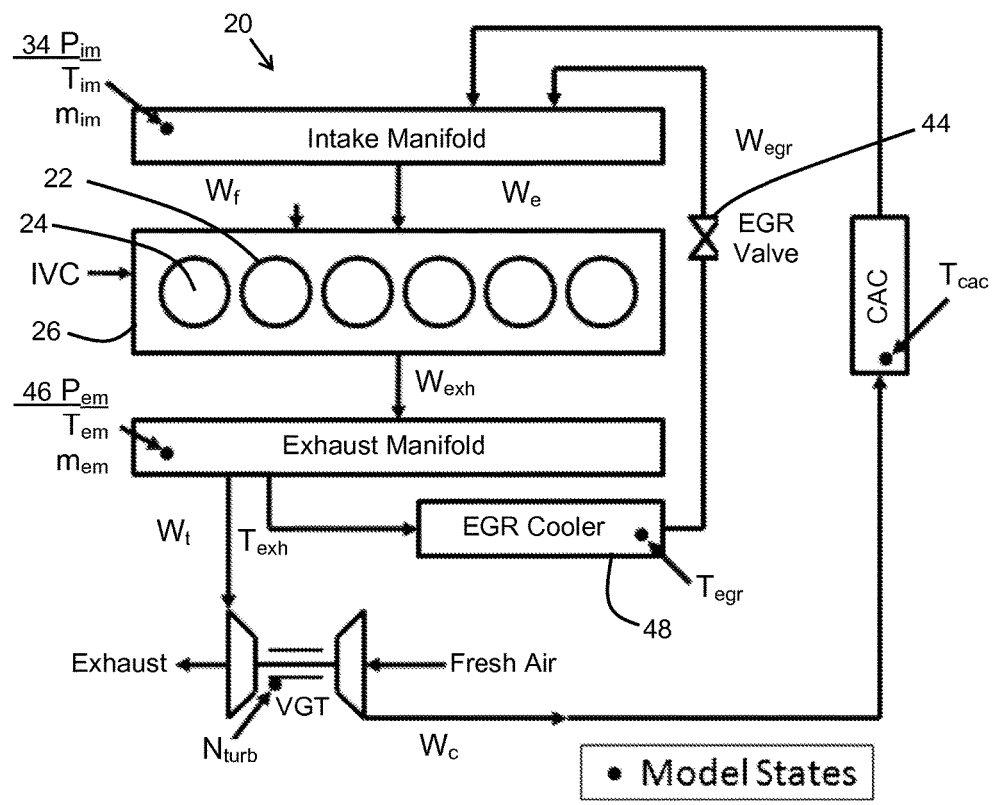
FIG. 3.1
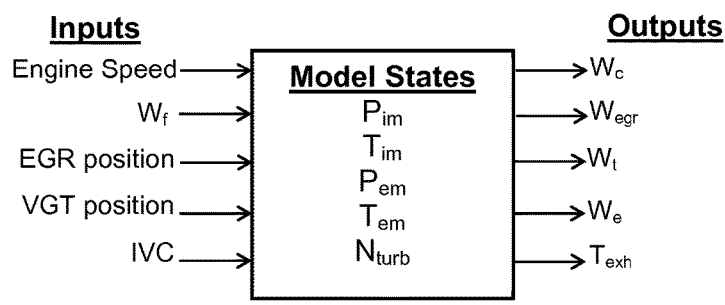
FIG. 3.2

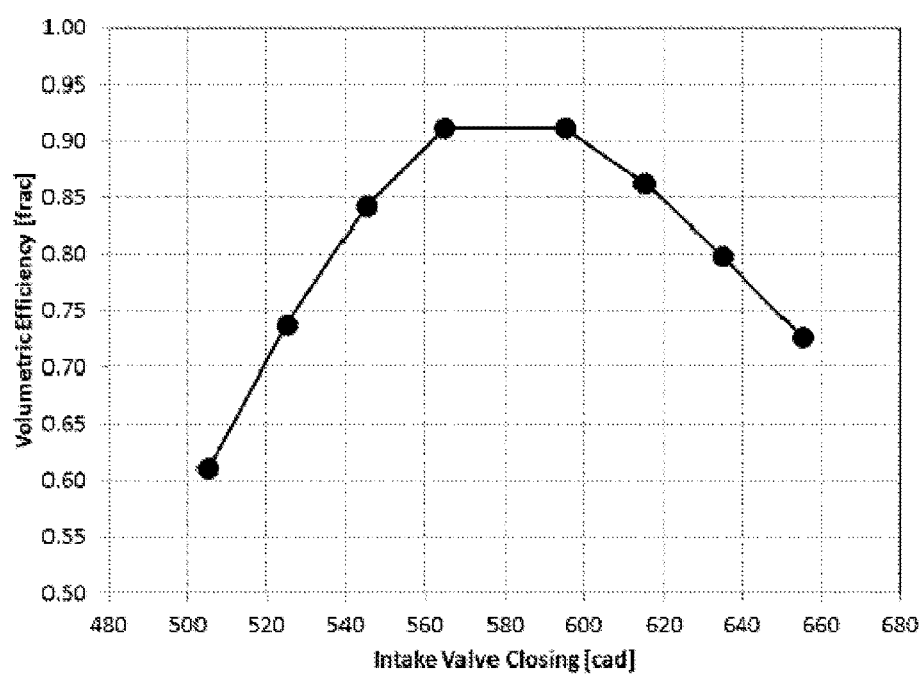
FIG. 3.3

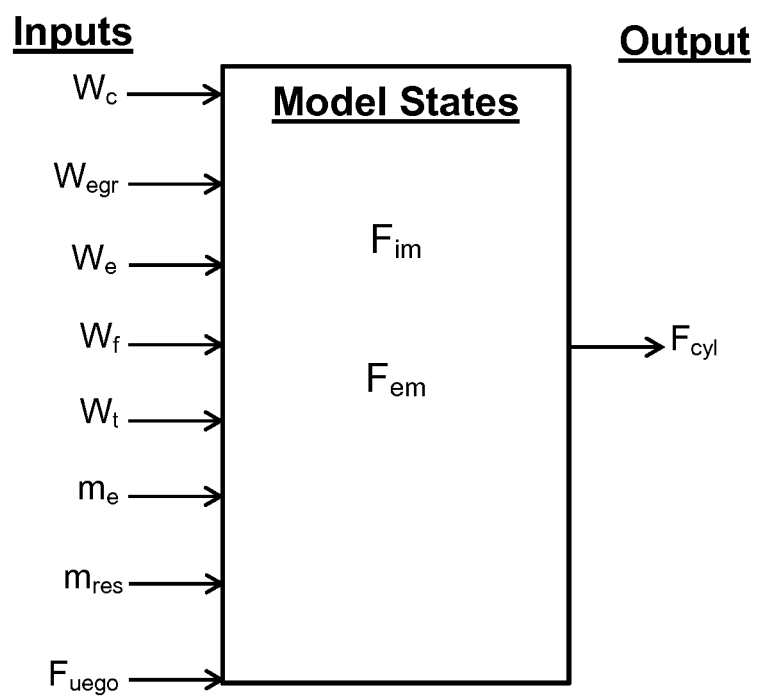
FIG. 4.1

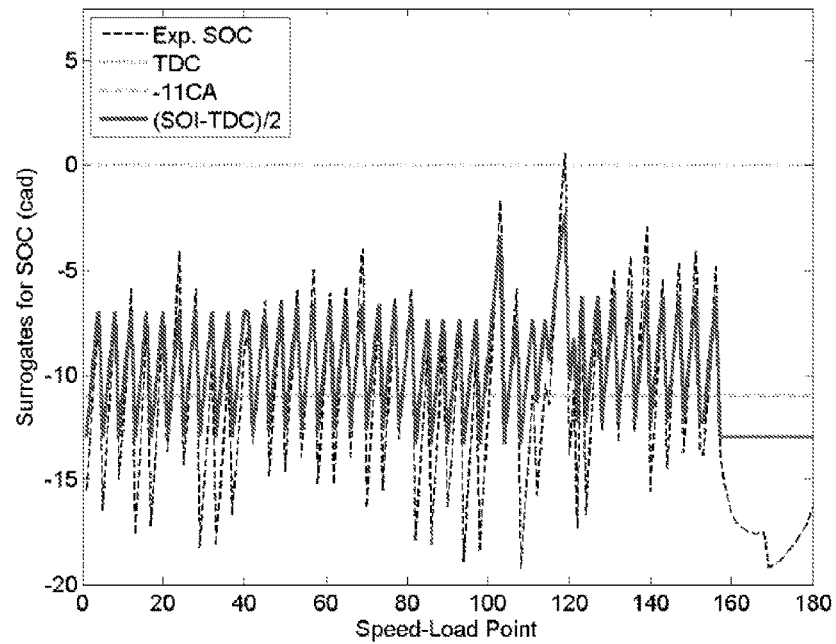
FIG. 5.3
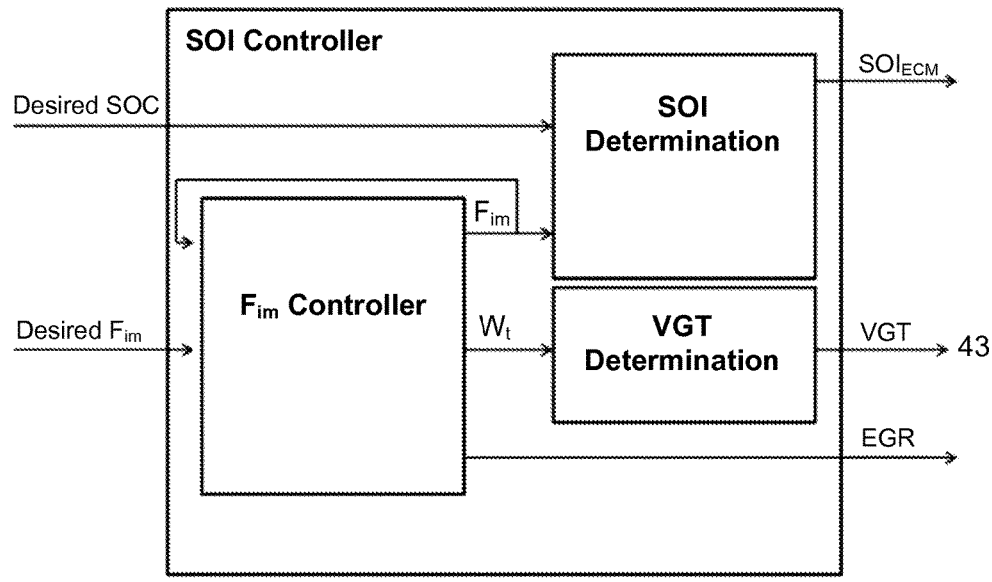
FIG. 5.11

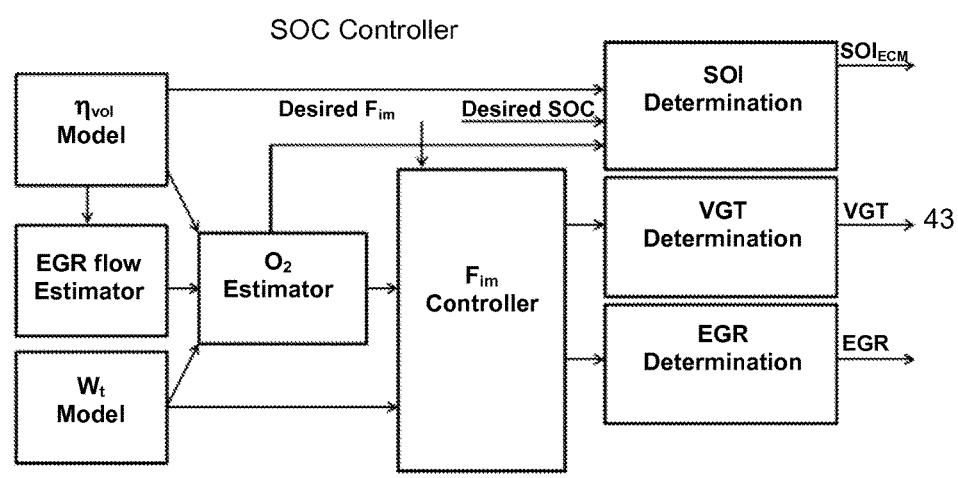
FIG. 5.12

NONLINEAR MODEL-BASED CONTROLLER FOR PREMIXED CHARGE COMPRESSION IGNITION COMBUSTION TIMING IN DIESEL ENGINES

CROSS REFERENCE TO RELATED APPLICATIONS

This application is a national stage of International Application Serial No. PCT/US2013/074709, filed Dec. 12, 2013, which claims the benefit of priority to U.S. Provisional Patent Application Ser. No. 61/736,346, filed Dec. 12, 2012, and U.S. Provisional Patent Application Ser. No. 61/784,204, filed Mar. 14, 2013, all of which are incorporated herein by reference.

GOVERNMENT RIGHTS

This invention was made with government support under DE-EE0003403 awarded by Department of Energy. The government has certain rights in the invention.

BACKGROUND OF THE INVENTION

Engine developers continually balance the tightening emissions legislation with consumer demands for maximum fuel efficiency. In modern diesel engines, after treatment systems are deployed to reduce the engine-out emissions to the legislated tailpipe-out levels. While the after treatment systems are effective in reducing emissions, the true cost of their usage is the increase in fuel consumption required.

Advanced combustion modes including diesel premixed charge compression ignition (PCCI), homogenous charge compression ignition (HCCI) and low temperature combustion (LTC) offer the potential of reduced emissions while maintaining high engine efficiency. The lack of a direct combustion trigger has previously limited the widespread adoption of diesel PCCI and other advanced combustion modes. In laboratory testing, these strategies have been shown to be enabled through the flexibility gained through the use of flexible valvetrains. The control of these strategies is assisted by control authority over some of the inputs governing the combustion event, including the in-cylinder oxygen fraction.

Advanced combustion modes, such as PCCI, operate near the combustion system stability limits. In PCCI, the combustion event begins without a direct combustion trigger in contrast to traditional spark-ignited gasoline engine and direct-injected diesel engines. The direct combustion trigger can be replaced in some embodiments by the usage of model-based controls to provide robust control of the combustion phasing. The nonlinear relationships between the control inputs and the combustion system response can limit the effectiveness of traditional, non-model-based controllers. Accurate knowledge of the system states and inputs is helpful in implementation of an effective nonlinear controller.

SUMMARY OF THE INVENTION

Diesel PCCI combustion is an advanced combustion mode capable of simultaneous reductions in NOx and PM over conventional diesel combustion. However, although PCCI lacks a direct combustion trigger, some embodiments of the present invention utilize a closed-loop controller to provide control of the start of combustion. A nonlinear model-based closed-loop controller was designed to control the combustion phasing of PCCI. The controller preferably including a PCCI combustion timing model in some embodiments uses oxygen fraction dynamics, including those applications with a diesel engine incorporating flexible intake valve actuation.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions. Further, some of the figures shown herein may have been created from scaled drawings or from photographs that are scalable. It is understood that such dimensions, or the relative scaling within a figure, are by way of example, and not to be construed as limiting.

FIG. 3.1 is a schematic representation of gas exchange model states and flows.

FIG. 3.2 is a schematic representation of gas exchange model inputs, states and outputs.

FIG. 3.3 is a schematic representation of volumetric efficiency over IVC sweep at 1850 rpm and 407 N-m FIG. 4 are graphical representations of data PCCI combustion timing controller according to one embodiment of the present invention, SOC steps, $F_{im}$=18%, IVC=565 at 1600 rpm and 140 ft-lbf, including plots of: (a) manifold oxygen percentage, (b) actuator position, (c) start of combustion, and (d) flow, all as a function of time.

FIG. 5.3 is a graphical representation of possible alternatives for SOC in determining $\overline{P}$ and $\overline{T}$.

FIG. 5.11 is a block diagram of a PCCI controller structure according to one embodiment of the present invention.

FIG. 5.12 is a block diagram of a PCCI controller structure including estimators and models according to one embodiment of the present invention.

SYMBOLS

Figure 1:
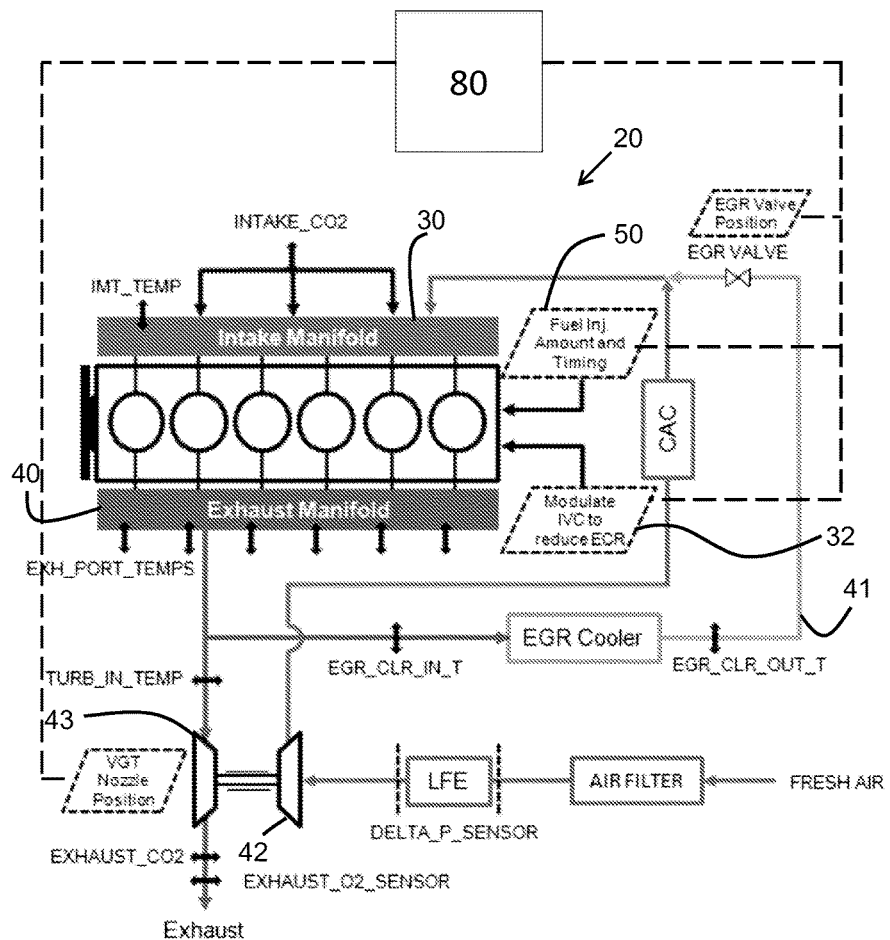
FIG. 1 is a schematic representation of a diesel engine according to one embodiment of the present invention.

° CA Degree Crank Angle
A Pre-exponential Constant
$E_a$ Activation Energy
α Constant Fit to Experimental Data
€ Auxiliary Variable in Observer Derivation
$\eta_{vol}$ Volumetric Efficiency
$\eta_{comp}$ Compressor Efficiency
$\eta_{turb}$ Turbine Efficiency
γ Ratio of Specific Heats $\gamma_{amb}$ Ratio of Specific Heats for Ambient Air
$\gamma_{im}$ Ratio of Specific Heats for Intake
$\gamma_{exh}$ Ratio of Specific Heats for Exhaust
$\kappa$ Observer Gain
$\rho_{im}$ Density at Intake Manifold Conditions
$\theta$ Crank Angle Position
$\phi$ Equivalence Ratio
$\psi$ Pressure Ratio Correction Factor
$\tau_{elec}$ Electrical Delay
$\tau_{hyd}$ Hydraulic Delay
$\tau_{id}$ Ignition Delay
$\chi O_2$ Total In-Cylinder Oxygen Mass Fraction
$\chi O_{2,exh}$ Exhaust Oxygen Mass Fraction
$\chi O_{2,int}$ Intake Oxygen Mass Fraction
a Constant Fit to Experimental Data
b Constant Fit to Experimental Data
$b_1$ Arbitrary Positive Constant
e Error Between Estimate and Actual Value in Observer Derivation
x Unknown Value in Observer Derivation
$\hat{x}$ Estimate of Unknown Value in Observer Derivation
y Measured or Known Value in Observer Derivation
z Measured or Known Value in Observer Derivation
$c_1$ Constant Exponent for Oxygen
$c_2$ Constant Exponent for Pressure
$C_p$ Specific Heat for Constant Pressure
$C_{p,amb}$ Specific Heat for Constant Pressure of Ambient Air
$C_{p,exh}$ Specific Heat for Constant Pressure of Exhaust Gas
$C_v$ Specific Heat for Constant Volume
$h_i$ Enthalpy of Species i
$h_{ivo-ivc}$ Heat Transfer Coefficient
$h_{evo}$ In-Cylinder Enthalpy at Exhaust Valve Open
$h_{exh}$ Exhaust Gas Enthalpy in Exhaust Manifold
$k_a$ Polytropic Constant for Ambient Air
$k_e$ Polytropic Constant for Exhaust Gas
$k_{em}$ Inverse of Mass in Exhaust Manifold
$k_{im}$ Inverse of Mass in Intake Manifold
m Mass
$\dot{m}_b$ Exhaust Gas Back Flow Rate
$m_c$ In-Cylinder Charge Mass
$m_e$ Trapped In-Cylinder Charge Mass
$m_f$ Mass of Fuel Injected
$m_{ivc}$ Mass In-Cylinder at IVC
$m_r$ Trapped Residual In-Cylinder Mass
$m_{res}$ Total Residual In-Cylinder Mass
ms Milliseconds
n Polytropic Coefficient
$n_c$ Number of Cylinders
q Constant Exponent for Molar Percentage of Oxygen
$q_{LHV}$ Lower Heating Value of the Fuel
$t_{eoc}$ Time at End of Combustion
$t_{tdc}$ Time at Top Dead Center
$A_{eff}$ Effective Flow Area
C Discharge Coefficient
CAC Charge Air Cooler
E Total System Energy
$E_b$ Exhaust Gas Back Flow Energy
$E_c$ Charge Flow Energy
$E_{ivc}$ Energy at IVC
$E_{lost}$ Energy Lost from Exhaust Gas
$E_p$ Piston Work
$E_q$ Heat Transfer Energy
$E_r$ Residual Gas Energy
ECR Effective Compression Ratio
$F_{amb}$ Oxygen Fraction in Ambient Air
$F_{cyl}$ Oxygen Fraction Trapped In-Cylinder
$\hat{F}_{cyl}$ Estimated Oxygen Fraction Trapped In-Cylinder
$F_{em}$ Oxygen Fraction in Exhaust Manifold
$\hat{F}_{em}$ Estimated Oxygen Fraction in Exhaust Manifold
$F_{eo}$ Oxygen Fraction In-Cylinder After Combustion
$F_f$ Fuel Fraction Trapped In-Cylinder
$F_{im}$ Oxygen Fraction in Intake Manifold
$\hat{F}_{im}$ Estimated Oxygen Fraction in Intake Manifold
$F_{uego}$ Oxygen Fraction Measured in Exhaust Pipe
$I_{turb}$ Turbocharger Moment of Inertia
N Engine Speed
$N_{turb}$ Turbocharger Shaft Speed
$N_{turb,red}$ Reduced Turbocharger Shaft Speed
P Pressure
$\bar{P}$ Average Pressure Over the Ignition Delay Period
$P_{amb}$ Pressure of Ambient Air
$P_{cyl}$ In-Cylinder Pressure
$P_{comp}$ Compressor Power
$P_{em}$ Exhaust Manifold Pressure
$\hat{P}_{em}$ Estimated Exhaust Manifold Pressure
$P_{eoc}$ In-Cylinder Pressure at End of Combustion
$P_{evo}$ In-Cylinder Pressure at Exhaust Valve Open
$P_{evo}$ Pressure In-Cylinder at EVO
$P_{im}$ Intake Manifold Pressure
$P_{ivc}$ Pressure In-Cylinder at IVC
$P_{ivo}$ Pressure In-Cylinder at IVO
$P_{SOI}$ Pressure In-Cylinder at SOI
$P_{SOC}$ Pressure In-Cylinder at SOC $P_{\frac{SOI+TDC}{2}}$ Pressure In-Cylinder at $(SOI + TDC)/2$ $P_{turb}$ Turbine Power
$P_{tdc}$ In-Cylinder Pressure at Top Dead Center
$PR_c$ Compressor Pressure Ratio
$PR_t$ Turbine Pressure Ratio
Q Total Heat Transfer to the System
$Q_{LHV}$ Lower Heating Value of Fuel
R Ideal Gas Constant
$R_{im}$ Ideal Gas Constant for Intake Manifold Conditions
$R_{exh}$ Ideal Gas Constant of Exhaust
RMS Root Mean Square
$\bar{S}_p$ Mean Piston Speed
$S_a$ Surface Area
SA Surface Area-Time
T Temperature
$\bar{T}$ Average Temperature Over the Ignition Delay Period
$T_{amb}$ Temperature of Ambient Air
$T_{bd}$ Exhaust Temperature After Blow Down
$T_{cac}$ Temperature of Flow out of CAC
$T_{clt}$ Coolant Temperature
$T_{cyl}$ In-Cylinder Temperature
$T_{egr}$ EGR Flow Temperature
$T_{em}$ Exhaust Manifold Temperature
$T_{eoc}$ In-Cylinder Temperature at End of Combustion
$T_{evo}$ In-Cylinder Temperature at Exhaust Valve Open
$T_{exh}$ Temperature of Flow out of Cylinder
$T_{im}$ Intake Manifold Temperature
$T_{ivc}$ Temperature at Intake Valve Closure
$T_{ivc_{eff}}$ Effective Temperature at Intake Valve Closure
$T_{SOI}$ Temperature In-Cylinder at SOI
$T_{SOC}$ Temperature In-Cylinder at SOC $T_{\frac{SOI+TDC}{2}}$ Temperature In-Cylinder at $(SOI + TDC)/2$ $T_{tdc}$ In-Cylinder Temperature at Top Dead Center
$T_{wall}$ Estimated Cylinder Wall Temperature
V Volume
$V_{cyl}$ Cylinder Volume
$V_d$ Engine Swept Volume
$V_{em}$ Exhaust Manifold Volume
$V_{eoc}$ In-Cylinder Volume at End of Combustion
$V_{evc}$ In-Cylinder Volume at Exhaust Valve Closing
$V_{evo}$ In-Cylinder Volume at Exhaust Valve Open
$V_{exh}$ Exhaust Manifold Volume
$V_{im}$ Intake Manifold Volume
$V_{ivc}$ Volume at Intake Valve Closure
$V_{icc_{eff}}$ Effective Volume at Intake Valve Closure
$V_{ivo}$ Volume at Intake Valve Opening
$V_{SOI}$ Volume In-Cylinder at SOI
$V_{SOC}$ Volume In-Cylinder at SOC $V_{\frac{SOI+TDC}{2}}$ Volume In-Cylinder at $(SOI + TDC)/2$ $V_{tdc}$ In-Cylinder Volume at Top Dead Center
$W_c$ Flow through the Compressor
$W_{egr}$ EGR Flow
$\hat{W}_{egr}$ Estimate of EGR Flow
$W_e$ Charge Flow
$W_f$ Fuel Flow
$W_t$ Turbine Flow
$W_{t,red}$ Reduced Turbine Flow
X Fraction of Fuel Energy Going Towards Piston Travel
$X_{VGT}$ Variable Geometry Turbocharger Rack Position Element Numbering The following is a list of element numbers and at least one noun used to describe that element. It is understood that none of the embodiments disclosed herein are limited to these nouns, and these element numbers can further include other words that would be understood by a person of ordinary skill reading and reviewing this disclosure in its entirety.

| | |
|---|---|
| 20 | engine |
| 22 | cylinder |
| 24 | piston |
| 26 | crankshaft |
| 30 | intake manifold |
| 32 | variable intake valve system |
| 34 | pressure sensor |
| 40 | exhaust manifold |
| 41 | exhaust gas recirculation system |
| 42 | turbocharger |
| 43 | variable geometry turbine |
| 44 | EGR valve |
| 46 | pressure sensor |
| 48 | cooler |
| 50 | fuel injector |
| 80 | controller |

Description of the Preferred Embodiment

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention. It is understood that any reference to "the invention" is a reference to an embodiment of a family of inventions, with no single embodiment including an apparatus, process, or composition that should be included in all embodiments, unless otherwise stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims. The usage of words indicating preference, such as "preferably," refers to features and aspects that are present in at least one embodiment, but which are optional for some embodiments.

The use of an N-series prefix for an element number (NXX.XX) refers to an element that is the same as the non-prefixed element (XX.XX), except as shown and described thereafter. As an example, an element 1020.1 would be the same as element 20.1, except for those different features of element 1020.1 shown and described. Further, common elements and common features of related elements are drawn in the same manner in different figures, and/or use the same symbology in different figures. As such, it is not necessary to describe the features of 1020.1 and 20.1 that are the same, since these common features are apparent to a person of ordinary skill in the related field of technology. This description convention also applies to the use of prime ('), double prime ("), and triple prime ("') suffixed element numbers. Therefore, it is not necessary to describe the features of 20.1, 20.1', 20.1", and 20.1"' that are the same, since these common features are apparent to persons of ordinary skill in the related field of technology.

Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise explicitly noted, are approximate values, and should be considered as if the word "about" prefaced each quantity. Further, with discussion pertaining to a specific composition of matter, that description is by example only, and does not limit the applicability of other species of that composition, nor does it limit the applicability of other compositions unrelated to the cited composition.

What will be shown and described herein, along with various embodiments of the present invention, is discussion of one or more tests that were performed. It is understood that such examples are by way of examples only, and are not to be construed as being limitations on any embodiment of the present invention. Further, it is understood that embodiments of the present invention are not necessarily limited to or described by the mathematical analysis presented herein.

Various references may be made to one or more processes, algorithms, operational methods, or logic, accompanied by a diagram showing such organized in a particular sequence. It is understood that the order of such a sequence is by example only, and is not intended to be limiting on any embodiment of the invention.

Diesel PCCI combustion is an advanced combustion mode capable of simultaneous reductions in NOx and PM over conventional diesel combustion. However, PCCI lacks a direct combustion trigger and therefore requires a closed-loop controller to provide robustness. A nonlinear model-based closed-loop controller was designed to control the combustion phasing of PCCI. The controller is based upon a PCCI combustion timing model and the oxygen fraction dynamics for a modern diesel engine incorporating flexible intake valve actuation. The controller stability was demonstrated through Lyapunov analysis and selection of controller gains K and L. The controller was experimentally validated at multiple operating conditions demonstrating the controller's ability to control the SOC to the desired SOC within about 1 CAD and control the $F_{im}$ to within about 1% oxygen of the desired $F_{im}$.

One embodiment of the present invention uses a control algorithm adapted and configured to allow for estimation and control of the gas exchange and combustion processes for diesel engines, including those utilizing flexible intake valve actuation. A physically-based volumetric efficiency model according to one embodiment of the present invention captures the direct impact of flexible intake valve actuation on the gas exchange process and the amount of gas trapped in-cylinder. The physically-based nature of the volumetric efficiency model allows the residual mass trapped in-cylinder to be calculated as well as provides an approach to estimate the effective compression ratio in-cylinder without the use of an in-cylinder pressure measurement. A control-oriented gas exchange algorithm according to one embodiment of the present invention utilizes the volumetric efficiency model, along with a physically-based exhaust gas enthalpy model and analytical turbocharger performance function, to describe the gas exchange process of a multi-cylinder turbocharged diesel engine (20) with cooled exhaust gas recirculation (41,48) and flexible intake valve actuation (32). The gas exchange model provides the basis for estimation and control design.

An in-cylinder oxygen fraction estimator, in some embodiments, utilizes a gas exchange model and incorporates the oxygen fraction dynamics of the engine. In-cylinder oxygen fraction can be a control input to the combustion process. Control of in-cylinder oxygen fraction is useful to control combustion timing, especially in advanced combustion strategies such as PCCI and LTC. These advanced combustion modes operate near the system stability limits. In PCCI, the combustion event begins without a direct combustion trigger in contrast to traditional spark-ignited gasoline engine and direct-injected diesel engines. The lack of a direct combustion trigger makes helpful the usage of model-based controls to provide control of the combustion phasing. An oxygen fraction estimator, physically-based volumetric efficiency model, PCCI combustion timing model and gas exchange model provide the required information. Various nonlinear controllers are disclosed based upon these models to control the engine combustion timing during diesel PCCI operation, and can include targeting desired values of the in-cylinder oxygen concentration, pressure, and temperature during early fuel injection.

In one embodiment of the present invention, a controller (80) is developed to allow tracking of a desired start of combustion (SOC) target in diesel PCCI combustion. The controller in some embodiments utilizes the VGT actuator (43) to control the intake manifold oxygen fraction to a desired value and additionally in yet other embodiments modifies the ECM (80) commanded start of injection (SOI) to achieve the desired SOC. Feedback for the oxygen fraction controller can be provided by an oxygen fraction estimator, as disclosed in U.S. Provisional Patent Application No. 61/695,672, filed Aug. 31, 2012, incorporated herein by reference.

Stability of the PCCI combustion timing controller according to one embodiment is shown through the application of Lyapunov theory. The controller is designed to track the desired intake manifold oxygen fraction to within about 1% $O_2$ with asymptotic stability. The desired SOC is achieved by inverting the PCCI combustion timing model to calculate the necessary SOI command. The desired SOC is controlled to within about 1 crank angle degree (CAD). One controller is validated on an engine utilizing high pressure cooled (48) exhaust gas recirculation, variable geometry (43) turbocharging (42) and flexible intake valve actuation (32), although it is understood that not all embodiments include such features. A direct measurement of the SOC is used for comparison by utilizing an in-cylinder pressure transducer and crank angle encoder processing the cycle data in real-time in dSPACE.

A 2010 Cummins diesel engine (20) outfitted with an electrohydraulic variable valve actuation (VVA) system (32) was utilized in this work. The Cummins ISB engine is a 6.7 liter, 360 horsepower, 6-cylinder direct-injection diesel engine. As shown in FIG. 1, the engine is an in-line six configuration. The engine comes equipped with common rail fuel injection system (50) with multi-pulse injection capability and a cooled exhaust gas recirculation (EGR) loop. The engine also has a variable geometry turbocharger (VGT) (42) to boost engine performance over the entire operating range as well as an electronic EGR valve (44) to allow control of fresh charge and EGR flows delivered to the cylinder.

The electro-hydraulic VVA system is capable of modifying the intake valve opening, the peak intake valve lift, and the intake valve closing on a cylinder-independent, cycle-to-cycle basis. It is understood that yet other embodiments of the present invention contemplate engines without variable valve systems, and further those having variable valve systems that do not include all of the mentioned features.

The experimental engine data is acquired using a dSPACE system. The dSPACE system collects data from the engine electronic control module (ECM) (80) such as the fueling and timing commands as well as ECM sensor measurements. The engine is equipped with an open architecture ECM that allows direct read and write access to the memory locations at 100 Hz. The dSPACE system also collects data from additional temperature, pressure, flow and emissions measurements instrumented on the engine test bed. Fresh air mass flow rate is measured using a laminar flow element (LFE) device. The engine charge flow is calculated using the LFE fresh air flow measurement and the measured EGR fraction. Emission gas analyzers are used to measure the composition of the exhaust gases as well as the concentration of $CO_2$ in the intake manifold (30). EGR fraction is computed using the intake and exhaust manifold $CO_2$ measurements. The intake manifold $CO_2$ is sampled in three locations and averaged to provide a measurement average of the true intake manifold $CO_2$, as shown in FIG. 1. A universal exhaust gas oxygen (UEGO) sensor is mounted in the exhaust pipe shortly after the turbine outlet as shown in FIG. 1.

A short description of a model is provided below based upon the model derivation in one embodiment. The time delay that exists between the ECM-commanded start of fuel injection ($SOI_{ecm}$) and the start of combustion (SOC) is modeled as three distinct, consecutive delays:

$$SOI_{ecm} + \tau_{elec} + \tau_{hyd} + \tau_{id} = SOC \quad (1)$$

where $t_{elec}$ is the delay present in the electrical system, $t_{hyd}$ is the hydraulic delay present in the injector, and $t_{id}$ is the ignition delay. This model can be implemented in units of time (ms) or crank angle (° C.A).

Analysis of the injector current signal reveals a difference between the ECM-commanded SOI timing and when the injector current actually begins to rise. This average value is the electrical delay $t_{elec}$:

$$\tau_{elec} = -1.3° \text{ CA}. \quad (2)$$

The next delay in the system is a hydraulic delay in the injector, which is the time between when the injector current signal is enabled and when fuel droplets actually begin exiting the injector nozzle. Injection rateshape profiles can provide characterization of the hydraulic delay for a variety of engine speed and load conditions. The hydraulic delay in one embodiment is constant in the time domain at 0:3 ms, with:

$$\tau_{hyd} = 0\ 0.0018N° \text{ CA} \quad (3)$$

Characterization of the electrical and hydraulic delays can provide knowledge of the true SOI. The ignition delay is defined as the delay between the true SOI and SOC. SOC according to one embodiment of the present invention is the location of the minimum of the integrated apparent heat release rate (AHRR) curve. This metric can be used for SOC because vaporization of the injected fuel will drive the integrated AHRR curve to its minimum, and any subsequent increase from that minimum signifies that positive heat release is occurring and the combustion reaction has initiated.

Analysis of experimental data indicates that the ignition delay has some dependence on both the amount of $O_2$ available and the amount of diluent in the cylinder. To capture these effects, the total in-cylinder $O_2$ mass fraction is defined:

$$\chi_{O_2} = \frac{m_{O_2,total}}{m_{charge,total}} \quad (5.6)$$

where $m_{O2;total}$ is the total mass of $O_2$ in the cylinder and $m_{charge;total}$ is the total mass of charge (fresh air, EGR, residual, and backflow) in the cylinder. This total in-cylinder $O_2$ fraction metric will capture changes in both the in-cylinder $O_2$ and in-cylinder diluent (via the $m_{charge;total}$ term).

The EGR, residual, and backflow of exhaust gases will contain some amount of O2 during lean operation, which contributes to the total mass of $O_2$ in the cylinder. The total mass of $O_2$ is:

$$m_{O_2,total} = (m_{FAF} + m_{EGR})\chi_{O_2,int} + (m_{res} + m_{back})\chi_{O_2,exh}, \quad (5.7)$$

where $m_{FAF}$ is the mass of fresh air, $m_{EGR}$ is the mass of EGR, $\chi_{O2;int}$ is the oxygen fraction in the intake manifold, $m_{res}$ is the mass of residual burned gas in the cylinder, $m_{back}$ is the mass of burned gas that backflows into the cylinder during valve overlap, and $\chi_{O2;exh}$ is the oxygen fraction in the exhaust manifold (40). Accordingly, the total mass of charge is:

$$m_{charge,total} = m_{FAF} + m_{EGR} + m_{res} + m_{back}. \quad (5.8)$$

In some embodiments, the fresh air flow and EGR flow are experimentally measured values. The oxygen fractions in the intake and exhaust manifolds are also experimentally measured using the oxygen sensor and $CO_2$ analyzers. The residual and backflow are modeled using the ideal gas law:

$$m_{res} = \frac{P_{IVO} V_{IVO}}{R_{exh} T_{exh}} \quad (5.9)$$

$$m_{back} = \frac{1}{R_{exh} T_{exh}} ((PV)_{EVC} - (PV)_{IVO}) \quad (5.10)$$

$$= \frac{1}{R_{exh} T_{exh}} (P_{EVC} V_{EVC} - P_{IVO} V_{IVO}). \quad (5.11)$$

Three assumptions are made. First, the temperature of the residual or reinducted exhaust gases, $T_{exh}$, is the same as that of the gas in the exhaust manifold, $T_{EM}$. Secondly, prior to IVO the exhaust valve is open, such that the in-cylinder pressure will be similar to the exhaust manifold pressure, $P_{EM}$. Thus the in-cylinder pressure when the intake valve begins to open, $P_{IVO}$ is approximated as $P_{EM}$. Lastly, when the exhaust valve closes, the intake valve is still fully open, such that the in-cylinder pressure will be similar to the intake manifold pressure, $P_{IM}$. Thus the in-cylinder pressure at EVC, $P_{EVC}$, is approximated as $P_{IM}$. With these assumptions, equations (5.9) and (5.11) become:

$$m_{res} = \frac{P_{EM} V_{IVO}}{R_{exh} T_{EM}} \quad (5.12)$$

$$m_{back} = \frac{1}{R_{exh} T_{EM}} (P_{IM} V_{EVC} - P_{EM} V_{IVO}). \quad (5.13)$$

The three assumptions according to one embodiment of the present invention allow definition of the residual and backflow in terms of the intake and exhaust manifold conditions as opposed to in-cylinder conditions, utilizing common manifold sensors (34, 46) in lieu of an in-cylinder pressure transducer in some embodiments. The quantity $R_{exh}$ is taken to be constant at 0.2866 kJ/kg-K and is calculated from experimental data. Cases with negative valve overlap (NVO) are taken to have $m_{back} = 0$.

The ignition delay can be modeled using an Arrhenius-type correlation in which the usual pre-exponential constant $A_{exp}$ is broken into two separate factors of A and $\phi^{-c1}$:

$$\tau_{id} = A\phi^{-c1} \overline{P}^{-c2} e^{(E_a/R_u T)} \quad (5.14)$$

where A is a pre-exponential constant, $\phi$ is the fuel-air equivalence ratio, $R_u$ is the universal gas constant, $E_a$ is the activation energy for the fuel, and $c_1$ and $c_2$ are constants. $\overline{P}$ and $\overline{T}$ are the average pressure and average temperature, respectively, over the ignition delay period of SOI to SOC.

The model form in Equation (5.14) is modified here to include dependence on the total in-cylinder O2 mass fraction $\chi_{O2}$ instead of the fuel-air equivalence ratio $\phi$. This includes in the correlation the influence of changes in the total in-cylinder $O_2$ and the total in-cylinder diluent. The model form becomes:

$$\tau_{id} = A\chi_{O_2}^{-c_1} \overline{P}^{-c_2} e^{\left(\frac{E_a}{R_a T}\right)}. \quad (5.15)$$

Defining the average pressure and temperature over ignition delay period of SOI to SOC is helpful:

$$\bar{P} = \frac{P_{SOC} + P_{SOI}}{2} \quad (5.16)$$

$$\bar{T} = \frac{T_{SOC} + T_{SOI}}{2}. \quad (5.17)$$

TDC is an appropriate surrogate for SOC, however, in this study the early-injection PCCI combustion commonly begins well before TDC such that using this as the surrogate is less desirable. An improvement would be to compute the averages between SOI and −11° C.A, where −11° C.A is the average SOC of the experimental data. Analysis of the experimental data shows that SOC tends to fall roughly halfway between SOI and TDC as:

$$SOC \approx \frac{SOI + TDC}{2}. \quad (5.18)$$

The accuracy of these three surrogates is representing SOC is presented in FIG. 5.3. Note that the experimental SOC valves are included for reference. The surrogate in equation 5.18) is one representation of the actual SOC and its trends and it has dependence on SOI which is known to strongly influence the SOC. Combining equation (5.18) with equations (5.16) and (5.17) gives a useful definition of the average pressure and temperature as:

$$\bar{P} = \frac{P_{\left(\frac{SOI+TDC}{2}\right)} + P_{SOI}}{2} \quad (5.19)$$

$$\bar{T} = \frac{T_{\left(\frac{SOI+TDC}{2}\right)} + T_{SOI}}{2} \quad (5.20)$$

Using a pressure-based estimation of effective compression ratio (ECR) using polytropic compression and ideal gas law can be substituted into the expressions for $\bar{P}$ and $\bar{T}$ in equations (5.19) and (5.20) with simplification gives equations (4) and (5).

The ignition delay can be modeled using an Arrhenius-type correlation. As shown in (5.15). The model form is modified here to include dependence on the total in-cylinder $O_2$ mass fraction $F_{cyl}$. Defining the average pressure and temperature over the ignition delay period of SOI to SOC is done as follows:

$$\bar{P} = \frac{1}{2} P_{IM} V_{IVC}^{n_p} \left( V_{\left(\frac{SOI+TDC}{2}\right)}^{-n_p} + V_{SOI}^{-n_p} \right) \quad (4)$$

$$\bar{T} = \frac{\frac{1}{2} P_{IM} V_{IVC}^{n_p}}{m_{charge} R_{charge}} \left( V_{\left(\frac{SOI+TDC}{2}\right)}^{-n_p+1} + V_{SOI}^{-n_p+1} \right) \quad (5)$$

The resulting ignition delay model is:

$$\tau_{id} = 0.051 F_{cyl}^{-1.14} \bar{P}^{-0.51} e^{\left(\frac{2100}{\bar{T}}\right)}, \quad (6)$$

where $t_{id}$ is in ms, Fcyl has no units, $\bar{P}$ is in bar, and $\bar{T}$ is in K.

Combining the $t_{id}$ model in equation (6) with the electrical and hydraulic delays in equations (2) and (3) completes the PCCI combustion timing model first described in equation (1):

$$SOC = -1.3 + 0.0018N + 0.006N \left( 0.051 F_{cyl}^{-1.14} \bar{P}^{-0.51} e^{\left(\frac{2100}{\bar{T}}\right)} \right) + SOI_{ecm}, \quad (7)$$

in ° CA with $\bar{P}$ and $\bar{T}$ calculated from equations, (4), and (5) respectively, and N in rpm.

The model detailed above is experimentally validated against 180 PCCI data points collected on the experimental engine testbed. $SOI_{ecm}$ and IVC sweeps were performed at twelve nominal speed-load conditions, namely 271, 203, and 102 Nm (200, 150, 75 ft-lbs), each at 2400, 2000, 1600, and 1200 rpm. The VGT position was varied to provide sufficient EGR to remain in a PCCI combustion mode. All data points presented in this study have a single main injection of fuel and have carbon balance error less than ±10%. Note that all timings are reported in ° CA after TDC (ATDC) of firing.

Figure 2:
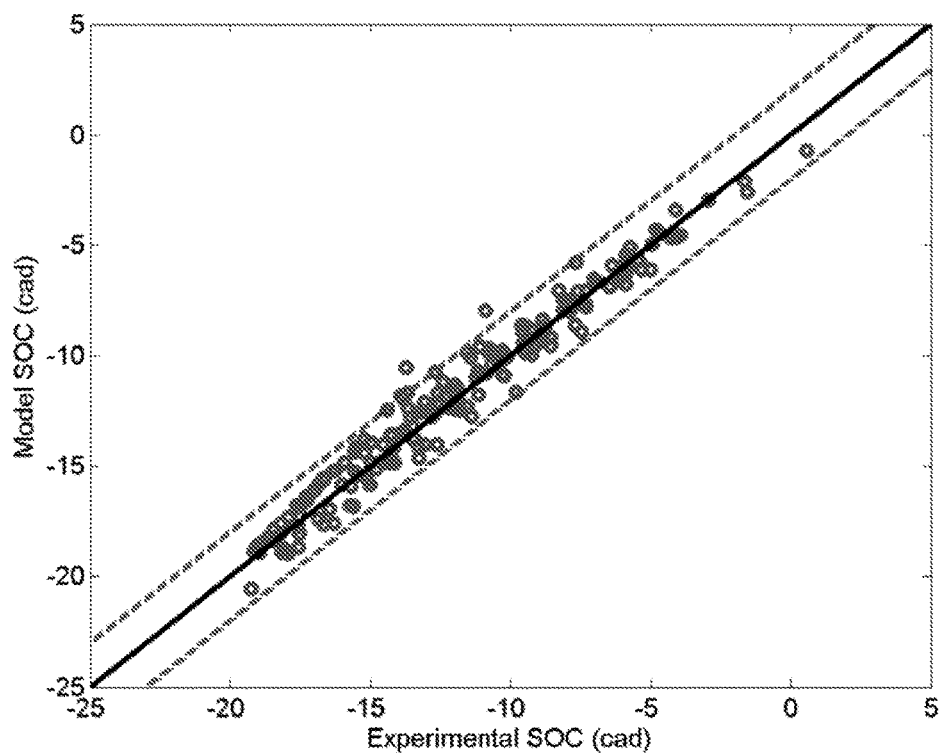
FIG. 2 is a graphical representation of a scatter plot of model vs. experimental SOC (dashed lines are ±2° C.A) for the engine of FIG. 1 controlled by an algorithm according to one embodiment of the present invention.

A PCCI combustion timing model according to one embodiment of the present invention as shown in equation (7) maps from $SOI_{ecm}$ to SOC given knowledge of total in-cylinder $O_2$ mass fraction $F_{im}$, the average pressure and temperature across the ignition delay; $\bar{P},\bar{T}$, and engine speed N. The model predicts the start of combustion within about ±2° C.A of the experimental values for all but three of the 180 data points. The RMS error is 0:86° C.A. FIG. 2 shows the model and experimental SOC data in a scatter plot for comparison. The solid line is the 1:1 line and the dashed lines signify ±2° C.A.

The design of the PCCI combustion timing controller according to one embodiment of the present invention begins by examining the relationship between the control inputs and the desired SOC as described in Eq. 7 and Eq. 24. The inputs to the control model include the ECM-commanded SOI, the in-cylinder oxygen fraction and the in-cylinder temperature and pressure during the ignition delay period. The inputs can be separated based upon the speed of the dynamics associated with the inputs. In this case, the in-cylinder oxygen fraction and the pressure and temperature during the ignition delay period are dependent on the gas exchange processes while the commanded SOI is fast due to the bandwidth of the fuel system.

This separation of dynamics allows for a de-coupled controller approach according to one embodiment of the present invention. The slower controller can focus on controlling the dynamics associated with the gas exchange process and the faster controller can focus on controlling the dynamics associated with the fuel injection process. The in-cylinder oxygen fraction is close to the intake manifold oxygen fraction. This is due to the small amount of residual exhaust gas that remains in the cylinder. Therefore, the assumption will be made to neglect the effect of the residual exhaust gas on the in-cylinder oxygen fraction and the intake manifold oxygen fraction will be utilized directly in Eq. 7. The intake manifold oxygen fraction dynamics are shown in Eq. 8, $$\dot{F}_{im} = \frac{RT_{im}}{P_{im} V_{im}} [F_{amb} W_c + F_{em} W_{egr} - F_{im} W_e]. \quad (8)$$

Dissecting Eq. 8, the usage of the flows into the intake manifold, $W_c$ and $W_{egr}$, as well as the flow leaving the intake manifold, $W_e$, can be seen. The traditional control actuators for the gas exchange process include the EGR valve position and the VGT position. However, some PCCI combustion modes use large quantities of EGR resulting in an EGR valve position of 100% under most operating conditions. Therefore, the VGT position can be the controlling actuator for intake manifold oxygen fraction dynamics. The VGT position will directly impact the flow through the turbocharger turbine, $W_t$. The turbine flow can then be utilized to calculate the turbine power, $P_{turb}$, as shown in Eq. 9, $$P_{turb} = W_t c_{p,exh} \eta_{turb} T_{em} \left[ 1 - \frac{P_{amb}}{P_{em}} \right]^{\frac{\gamma_{exh}-1}{\gamma_{exh}}}. \tag{9}$$

Applying the steady-state assumption to the turbocharger shaft dynamics shown in Eq. 10, $$\dot{N}_{turb} = \frac{P_{turb} - P_{comp}}{I_{turb} N_{turb}}, \tag{10}$$

where $I_{turb}$ is the moment of inertia of the turbocharger, the compressor power, $P_{comp}$, can be assumed to be equal to the turbine power, $P_{turb}$. The compressor power, $P_{comp}$, can then be utilized to calculate the compressor flow, $W_c$ using Eq. 11, $$P_{comp} = \frac{W_c c_{p,amb} T_{amb}}{\eta_{comp}} \left[ \left(\frac{P_{im}}{P_{amb}}\right)^{\frac{\gamma_{amb}-1}{\gamma_{amb}}} - 1 \right], \tag{11}$$

thereby defining the relationship between the VGT position and the compressor flow. The steady-state assumption applied to the turbocharger shaft dynamics is reasonable given the large lumped volume between the turbocharger compressor outlet and the intake manifold. To simplify the notation, the following substitutions are made:

$$W_c = k_{comp} P_{comp} \tag{12}$$

$$k_{comp} = \frac{\eta_{comp}}{c_{p,amb} T_{amb} \left[ \left(\frac{P_{im}}{P_{amb}}\right)^{\frac{\gamma_{amb}-1}{\gamma_{amb}}} - 1 \right]} \tag{13}$$

$$P_{turb} = k_{turb} W_t \tag{14}$$

$$k_{turb} = \eta_{turb} c_{p,exh} T_{em} \left[ 1 - \left(\frac{P_{amb}}{P_{em}}\right)^{\frac{\gamma_{exh}-1}{\gamma_{exh}}} \right] \tag{15}$$

$$W_c = k_{comp} k_{turb} W_t \tag{16}$$

$$k_{F_{im}} = \frac{R_{im} T_{im}}{P_{im} V_{im}}. \tag{17}$$

The $W_{egr}$ term in Eq. 8 will be treated as a disturbance to the system since one control actuator, the EGR valve position, is saturated at its maximum position in some embodiments. However, it is understood that in some embodiments and as known to those of ordinary skill in the art the EGR valve can be actuated over a range of positions by the electronic controller, so as to modify the amount of recirculated exhaust gas being provided in the charge within the cylinder.

The value of $W_{egr}$ is provided by an EGR flow estimator and can be dependent on the pressure drop across the engine. The intake manifold oxygen fraction dynamics are now cast into a state-space equivalent form in Eq. 18, $$\dot{F}_{im} = k_{F_{im}} F_{amb} k_{comp} k_{turb} W_t + k_{F_{im}} F_{em} W_{egr} - k_{F_{im}} F_{im} W_e. \tag{18}$$

Equation 18 can be expressed as a linear parameter varying form as shown in Eq. 19, $$\dot{x} = A(\rho)x + B(\rho)u + G(\rho) \tag{19}$$

$$A(\rho) = -k_{F_{im}} W_e \tag{20}$$

$$B(\rho) = k_{F_{im}} F_{amb} k_{comp} k_{turb} \tag{21}$$

$$G(\rho) = k_{F_{im}} F_{em} W_{egr}, \tag{22}$$

where the system parameters are expressed in $\rho$, the state is the intake manifold oxygen fraction, $F_{im}$, and the input u is the turbine flow, $W_t$, that is directly controllable by adjusting the VGT position.

With the system dynamics defined, a control law may be selected to stabilize the system and provide reference tracking to the desired $F_{im}$ values. One control law is shown in Eq. 23, $$u = K(r_f - x) + L, \tag{23}$$

where $r_f$ is the filtered version of the $F_{im}$ reference command, r, after it is filtered by the system dynamics as shown in Eq. 24, $$\dot{r}_f = Ar_f - Ar = -k_{F_{im}} W_e r_f + k_{F_{im}} W_e r. \tag{24}$$

Substitution of the control law in Eq. 23 into the system dynamic equation, Eq. 18 yields the closed-loop expression shown in Eq. 25, $$\dot{x} = Ax + B[K(r_f - x) + L] + G. \tag{25}$$

With the control law selected for the slower gas exchange dynamics, fixing the values of $F_{im}$, $\overline{P}$ and $\overline{T}$. the ECM commanded SOI can be determined based upon the engine speed and the desired SOC. $SOI_{ecm}$ is calculated using Eq. 26 (also see Eq. 7), $$SOI_{ecm} = SOC - 1.3 - 0.0018N - 0.006N \left( 0.051 F_{im}^{-1.14} P^{-0.51} e^{\left(\frac{2100}{T}\right)} \right) \tag{26}$$

With the closed-loop system dynamics and the reference filter dynamics defined, the stability of the closed-loop system may be analyzed by examining the error dynamics as shown in Eqs. 27 and 28, $$e = r_f - x \tag{27}$$

$$\dot{e} = \dot{r}_f - \dot{x}. \tag{28}$$

Substitution of the expressions for $\dot{r}_f$ and $\dot{x}$ into Eq. 28 yields the expression shown in Eq. 29, $$\dot{e} = Ar_f - Ar - Ax - B[K(r_f - x) + L] - G. \tag{29}$$

After simplification, the expression for $\dot{e}$ can be shown as in Eq. 30.

$$\dot{e} = (A - BK)e - Ar - BL - G. \tag{30}$$

The gain L may be selected as shown in Eq. 31 to negate the error dynamics associated with the original reference command r and the disturbance due to the $W_{egr}$ term:

$$L = \frac{-Ar - G}{B} \quad (31)$$

$$L = \frac{W_e r - F_{em} W_{egr}}{k_{comp} k_{turb} F_{amb}}. \quad (32)$$

This selection of the gain L will reduce the error dynamics as shown in Eq. 33, $$\dot{e} = (A - BK)e. \quad (33)$$

The selection of the gain K will be determined based upon experimental controller performance tuning and a Lyapunov analysis will be performed to assess stability. A Lyapunov function V is chosen as shown in Eq. 34. The derivative of the Lyapunov function is then calculated as shown in Eq. 35, $$V = \frac{1}{2}e^2 \quad (34)$$

$$\dot{V} = e\dot{e}. \quad (35)$$

Substituting the expression for $\dot{e}$ in Eq. 33 into Eq. 35 yields the expression shown in Eq. 36, $$\dot{V} = e[(A-BK)e]. \quad (36)$$

After substituting for A and B into Eq. 36, the expression can be simplified as shown in Eq. 37, $$\dot{V} = (-k_{F_{im}} W_e - k_{F_{im}} k_{comp} k_{turb} F_{amb} K)e^2. \quad (37)$$

To demonstrate stability, the Lyapunov function, V, needs to be positive definite and the derivative of the Lyapunov function, $\dot{V}$, needs to be negative definite. Examination of Eq. 37 shows that the error dynamics will be stable and $\dot{V}$ will be negative definite as long as K>0. The difficulty in selecting the gain K arises when evaluating the controller performance dynamically and assessing the desired performance and robustness tradeoffs associated with controller design. According to one embodiment of the present invention, an experimentally determined gain of 3000 was chosen to provide the best controller performance in terms of transient response, steady-state error and robustness. Therefore, the error dynamics should be stable and converging towards zero steady-state error asymptotically.

In one embodiment there is a low-order, five state model of the air handling system for a multi-cylinder variable geometry turbocharged diesel engine with cooled exhaust gas recirculation and flexible intake valve actuation, validated against 286 steady state and 62 transient engine operating points. The model can utilize engine speed, engine fueling, EGR valve position, VGT nozzle position and intake valve closing time as inputs to the model. The model outputs can include calculation for the engine flows as well as the exhaust temperature exiting the cylinder. The gas exchange model captures the dynamic effects of not only the standard air handling actuators (EGR valve position and VGT position) but also intake valve closing (IVC) timing, exercised over their useful operating ranges. The model's capabilities are enabled through the use of analytical functions to describe the performance of the turbocharger; a physically-based control-oriented exhaust gas enthalpy sub-model, and a physically-based volumetric efficiency sub-model.

The intake manifold is considered to be the lumped volume between the compressor outlet and the cylinders. All thermodynamic states are assumed to be constant throughout the volume. The governing equations for the intake manifold are:

$$\dot{P}_{im} = \frac{\gamma_{im} R_{im}}{V_{im}} (W_{egr} T_{egr} + W_c T_{cac} - W_e T_{im}) \quad (3.1)$$

$$\dot{T}_{im} = \frac{T_{im} R_{im}}{P_{im} V_{im}} \quad (3.2)$$

$$(W_{egr}(\gamma_{im} T_{egr} - T_{im}) + W_c(\gamma_{im} T_{cac} - T_{im}) + W_e(T_{im} - \gamma_{im} T_{im})),$$

where P, m, T and V denote pressure, mass, temperature and volume, respectively, at the subscripted state location. System flows are represented by W. Subscripts im, egr, and c refer to the properties of the model relating to the intake manifold, EGR cooler, and the compressor, respectively. System flows and states are shown in FIG. 3.1. The ratio of specific heats γm is the ratio of specific heats for the conditions found in the intake manifold.

Flow from the intake manifold into the cylinders, $W_e$, is modeled using the speed density equation $$W_e = \frac{1}{2} \rho_{im} \eta_{vol} V_d N, \quad (3.3)$$

$$\eta_{vol} = \frac{P_{im}\left(\frac{V_{ivc_{eff}}}{V_{ivc}}\right)^k V_{ivc} c_v - P_{cm} V_{ivo} c_v - P_{em}(V_{evc} - V_{ivo}) c_p}{P_{im} V_d c_p} + \frac{P_{im}(V_{ivc_{eff}} - V_{ivo})R - (h_{ivo-ivc}(T_{wall} - T_{im})SSA_{ivo-ivc})R}{P_{im} V_d c_p}. \quad (3.4)$$

The cylinder volumes at the valve events are utilized in Eq. 3.4 as $V_k$, where k can be replaced with ivo, ivc, $ivc_{eff}$ and $_{evc}$ for the intake valve opening, intake valve closing, intake valve effective closing and exhaust valve closing respectively. The specific heats, $c_p$ and $c_v$, are taken at intake manifold conditions. The heat transfer coefficient, $h_{ivo-ivc}$, is calculated based on the Woschni correlation. The cylinder wall temperature, $T_{wall}$ is estimated based upon the coolant temperature and the exhaust gas temperature. The surface area time, $SA_{ivo-ivc}$, is estimated based upon cylinder geometry and engine speed.

The volumetric efficiency model in Eq. 3.4 incorporates the effects of intake valve timing, IVO and IVC (intake valve opening and intake valve closing, respectively). The model was experimentally validated against 286 operating conditions to show accuracy within 5 percent over the entire operating range of the engine, including a 165 crank angle degree window for IVC timing. The aspect of capturing the effect of IVC timing is demonstrated in FIG. 3.3, namely, IVC modulation significantly influences the volumetric efficiency. While the data shown in FIG. 3.3 is for an operating condition of 1850 rpm and 407 N-m, the results and trends are similar under all other operating conditions. The incorporation of the volumetric efficiency sub-model enables the gas exchange model to capture the impact of IVO, IVC and manifold conditions on the volumetric efficiency over the operating range of the engine.

As is known in the art, the flow of recirculated exhaust gas into the charge in the cylinder is controlled by either the position of variable turbine geometry on a turbocharger, or by an actuatable EGR valve, or a combination of these two actuators. As one example, what will be shown in the following is a case where the EGR valve is at a substantially fixed position. EGR flow is modeled as a function of the upstream and downstream pressure of the EGR valve using the standard orifice flow equation $$W_k = \begin{cases} CA_{eff} \dfrac{p_i}{\sqrt{RT_i}} \Psi\left(\dfrac{p_j}{p_i}\right) & \text{if } p_j < p_i \\ 0 & \text{if } p_1 = p_2 \\ CA_{eff} \dfrac{p_j}{\sqrt{RT_j}} \Psi\left(\dfrac{p_i}{p_j}\right) & \text{if } p_j > p_i \end{cases} \quad (3.5)$$

Here, k can be replaced with egr to describe EGR flow, and subscripted indices I and j correspond to the upstream flow conditions and downstream flow conditions, respectively. In this case, upstream conditions are taken to be that of the EGR cooler exit. The pressure at the EGR cooler exit is assumed to be equal to the exhaust manifold pressure while the EGR cooler exit temperature is assumed to be a constant 400 K. It is understood that these assumptions of pressure and temperature are by way of example only, and are not constraints to any particular embodiment. Yet other embodiments contemplate other assumptions, and still further embodiments contemplate the use of sensors to provide measurements of exhaust pressure and exhaust temperature to the electronic controller, as known to those of ordinary skill in the art.

The constant temperature assumption is made due to the high effectiveness of the EGR cooler which utilizes engine coolant to cool the exhaust gases. The downstream conditions are taken to be that of the intake manifold. C is the discharge coefficient associated with the valve opening and $A_{eff}$ is the effective flow area, which is a function of the EGR valve position. The small pressure drop across the EGR cooler is lumped into the effective flow area term as a function of EGR valve position. The pressure ratio correction factor, kif, is given by $$\Psi\left(\dfrac{p_j}{p_j}\right) = \begin{cases} \sqrt{\gamma}\left(\dfrac{2}{\gamma+1}\right)^{((\gamma+1)/2(\gamma-1))} & \\ \text{if } \dfrac{p_i}{p_j} \leq \left(\dfrac{2}{\gamma+1}\right)^{\gamma/(\gamma-1)} & \\ \sqrt{\dfrac{2\gamma}{\gamma-1}\left(\left(\dfrac{p_i}{p_j}\right)^{2/\gamma} - \left(\dfrac{p_i}{p_j}\right)^{(\gamma+1)/\gamma}\right)}, & \\ \text{if } \dfrac{p_i}{p_j} > \left(\dfrac{2}{\gamma+1}\right)^{\gamma/(\gamma-1)} & \end{cases} \quad (3.6)$$

where γ corresponds to the ratio of specific heats for exhaust gas.

The exhaust manifold is defined as the lumped volume of the exhaust manifold, the EGR cooler, the volume of the EGR cross-over pipe up to the EGR valve and the turbocharger inlet volume. The modeling of the exhaust manifold is similar to that of the intake manifold:

$$\dot{P}_{em} = \dfrac{\gamma_{em} R_{em}}{V_{em}}((W_e + W_f)T_{exh} - W_{egr}T_{em} - W_t T_{em}) \quad (3.7)$$

$$\dot{T}_{em} = \dfrac{T_{em} R_{em}}{P_{em} V_{em}}((W_e + W_f)(\gamma_{em} T_{exh} - T_{em}) + \quad (3.8)$$
$$W_{egr}(T_{em} - \gamma_{em} T_{em}) + W_t(T_{em} - \gamma_{em} T_{em})),$$

where $R_{em}$ is the gas constant for the composition in the exhaust manifold and $T_{exh}$ is the temperature of the gas flowing out from the cylinder.

$T_{exh}$ is calculated using a physically-based sub-model of cylinder exhaust gas temperature. The model is formulated assuming polytropic compression and expansion, constant pressure combustion beginning at TDC, and the use of ECR. The blowdown process is modeled via the polytropic expansion assumption. The heat transfer is modeled using the basic heat transfer equation. The model accurately captures the effects of the charge mass, total fueling and effective compression ratio on the cylinder exhaust gas temperature. The exhaust temperature model dependence on ECR allows the model to accurately capture the effects of intake valve modulation on the cylinder exhaust gas temperature. The resulting model is shown in Eqs. 3.9-3.10, $$T_{evo} = \dfrac{P_{im}}{m_c R} \dfrac{ECR^{k_a}}{V_{evo}^{k_e-1}}\left(\dfrac{k_e-1}{k_e}\dfrac{(a \cdot N + b)m_f Q_{LHV}}{P_{im} ECR^{k_a}} + V_{tdc}\right)^{k_e} \quad (3.9)$$

$$P_{evo} = P_{im} ECR^{k_a}\left(\dfrac{\dfrac{k_e-1}{k_e}\dfrac{(a \cdot N + b)m_f Q_{LHV}}{P_{im} ECR^{k_a}} + V_{tdc}}{V_{evo}}\right)^{k_e} \quad (3.10)$$

The model inputs are the engine speed, charge mass, total fueling, intake manifold pressure, and effective compression ratio. The volumes, $V_{tdc}$ and $V_{evo}$, are known values given the engine geometry and exhaust valve opening (EVO) timing. $Q_{LHV}$ is the lower heating value of diesel fuel, $m_f$ is the mass of fuel injected into the cylinder and mc is the trapped mass in the cylinder. $k_e$ is the polytropic expansion coefficient.

The blowdown event is modeled as a polytropic expansion process from the incylinder conditions at EVO to the exhaust manifold conditions. The polytropic expansion coefficient for the exhaust gas, $k_e$, from Eqs. 3.9 and 3.10 is utilized. The blowdown temperature, $T_{bd}$, is calculated in Eq. 3.11, $$T_{bd} = T_{evo}\left(\dfrac{P_{em}}{P_{evo}}\right)^{\frac{k_e-1}{k_e}}. \quad (3.11)$$

The heat transfer rate from the exhaust gas is calculated in Eq. 3.13, $$q = hA(T_{bd} - T_{wall}). \quad (3.12)$$

The heat transfer coefficient, h, is calculated based upon the Woschni correlation. The surface area for heat transfer, A, is based upon the cylinder geometry. The effect on temperature of the exhaust gas due to heat transfer is captured in Eq. 3.14, $$q = hA(T_{bd} - T_{wall}) \quad (3.13)$$

$$E_{lost} = m_c c_p(T_{bd} - T_{exh}) = q\dfrac{30}{N}, \quad (3.14)$$

assuming a constant specific heat, $c_p$, and an engine speed, N. Combining and rearranging Eqs. 3.13 and 3.14 yields Eq. 3.15, $$T_{exh} = T_{bd} - \frac{hA(T_{bd} - T_{wall})\frac{30}{N}}{mc_p}, \quad (3.15)$$

for calculating the cylinder exhaust gas temperature.

With the assumption that the exhaust gas behaves as an ideal gas, the exhaust gas enthalpy can be calculated using Eqs. 3.15 and 3.16, $$h_{exh} = c_p(T_{exh}) \cdot T_{exh}. \quad (3.16)$$

Accurate cylinder exhaust gas temperature, pressure and enthalpy predictions are useful since the exhaust gas enthalpy and pressure drive the gas exchange process. As such, application of the physically-based model of cylinder exhaust gas temperature and pressure is useful for the gas exchange model to perform well over the entire engine operating map.

The variable geometry turbocharger is modeled using analytical functions, derived from the compressor and turbine maps provided by the turbocharger manufacturer, to determine the flow and efficiency of both the compressor and turbine. The use of analytical functions can be used as well as using a series of table look-up interpolations. The turbine maps of a variable geometry turbocharger include maps for turbine flow and turbine efficiency for each VGT setting.

The compressor flow is calculated using the pressure ratio across the compressor, $PR_c$, and the turbocharger shaft speed, $N_{turb}$ as shown in Eq. 3.17, $$W_c = N_{turb}^{1.2854}[5.5735 \times 10^{16} a_1 (PR_c^{0.2854} - 1)^3 N_{turb}^{-6} + \quad (3.17)$$
$$2.5755 \times 10^9 a_2 (PR_c^{0.2854} - 1)^2 N_{turb}^{-4} +$$
$$1.1902 \times 10^2 a_3 (PR_c^{0.2854} - 1) N_{turb}^{-2} + a_4].$$

For this particular compressor, values of $a_i$ found via weighted least squares are listed in Table 3.1.

TABLE 3.1

| Compressor mass flow constants. | |
|---|---|
| $a_1$ | $-1.0266 \times 10^9$ |
| $a_2$ | $1.7206 \times 10^6$ |
| $a_3$ | $-9.7634 \times 10^2$ |
| $a_4$ | $0.2148$ |

The compressor efficiency is calculated using the pressure ratio across the compressor, $PR_c$, the turbocharger shaft speed, $N_{turb}$ and the compressor flow, $W_c$ as shown in Eq. 3.18, $$\eta_{comp} = \frac{2.164 \times 10^7 (PR_c^{0.2854} - 1)}{2.0549 \times 10^4 c_1 W_c N_{turb} + c_2 N_{turb}^2}. \quad (3.18)$$

Here, $W_c$ is the compressor mass flow found using Eq. 3.17. The coefficients $c_i$ found using weighted least squares are listed in Table 3.2.

TABLE 3.2

| Compressor efficiency constants. | |
|---|---|
| $c_1$ | $-1.9886 \times 10^{-2}$ |
| $c_2$ | $1.3636 \times 10^{-3}$ |

The compressor power is then shown in Eq. 3.19, $$P_{comp} = \frac{W_c c_{p,amb} T_{amb}}{\eta_{comp}}\left[\left(\frac{P_{im}}{P_{amb}}\right)^{\frac{\gamma_{amb}-1}{\gamma_{amb}}} - 1\right]. \quad (3.19)$$

Turbine maps generally express turbine speed and mass flow in terms of reduced quantities to account for inlet conditions:

$$W_{t,red} = \frac{W_t \sqrt{T_{em}}}{p_{em}} \quad (3.20)$$

$$N_{turb,red} = \frac{N_{turb}}{\sqrt{T_{em}}}, \quad (3.21)$$

where $T_{em}$ and $pl_{em}$ are the turbine inlet temperature and pressure.

The turbine flow is calculated using the pressure ratio across the turbine, $PR_t$, the turbocharger shaft speed, $N_{turb}$, and the VGT nozzle position, $X_{VGT}$, as shown in Eq. 3.22, $$W_t = \pi d_t^2 (\gamma R_{exh})^{\frac{1}{2\gamma}}\left[b_1 + b_2 \sqrt{\frac{2c_{p,exh}\left(1 - PR_t^{\frac{1-\gamma}{\gamma}}\right)}{\left(\frac{\pi}{60}d_t N_{turb,red}\right)^2}}\right] \times \quad (3.22)$$

$$\frac{(\alpha_1 X_{VGT}^2 + \alpha_2 X_{VGT} + \alpha_3)\left(\frac{\pi}{60}d_t N_{turb,red}\right)^{\frac{2\gamma-1}{\gamma}}}{4R_{exh}\sqrt{2c_{p,exh}\left(1 - PR_t^{\frac{1-\gamma}{\gamma}}\right)}}.$$

Here, $R_{exh}$ and $c_{p;exh}$ are assumed to be constant. The values for $b_i$ and $\alpha_i$, found via least squares, are listed in Table 3.3. Note that the three inputs to Eq. 3.22 are $N_{turb;red}$, $PR_t$ and $X_{VGT}$, and result in reduced mass flow. This reduced mass flow can then be used in Eq. 3.20 to back out actual mass flow through the turbine.

The turbine efficiency is calculated in terms of turbine pressure ratio ($PR_t$) and reduced turbocharger shaft speed ($N_{turb;red}$):

TABLE 3.3

| Turbine mass flow constants. | |
|---|---|
| $b_1$ | $-2.8883 \times 10^{-2}$ |
| $b_2$ | $1.9318$ |
| $\alpha_1$ | $-1.2056$ |
| $\alpha_2$ | $2.2198$ |
| $\alpha_3$ | $-1.5203 \times 10^{-2}$ |

$$N_{t,est} = [\beta_1 - \beta_2 \exp(-\beta_3 X_{VGT}) - \beta_4 \ln(X_{VGT})] \times \quad (3.23)$$

$$\left(k_1 + k_2 \sqrt{\frac{2c_{p,exh}\left(1 - PR_t^{\frac{1-\gamma}{\gamma}}\right)}{\left(\frac{\pi}{60}d_t N_{turb,red}\right)^2}}\right) \times \frac{(\gamma R)^{\frac{1-\gamma}{2\gamma}}\left(\frac{\pi}{60}d_t N_{turb,red}\right)^{\frac{3\gamma-1}{\gamma}}}{2c_{p,exh}\left(1 - PR_t^{\frac{1-\gamma}{\gamma}}\right)}.$$

Again, $c_{p;exh}$ and $R_{exh}$ are assumed to be constant here. Values for coefficients $k_i$ and $\beta_j$ are listed in Table 3.4. The three inputs to Equation 3.23 are $N_{tc}$, $PR_t$ and $X_{VGT}$. Equation 3.23 can therefore be used to analytically determine the turbine efficiency. The turbine efficiency, $\eta_{turb}$, provided in the turbocharger maps contains the mechanical shaft efficiency due to the turbine being tested with the compressor attached. The turbine power is then calculated in Eq. 3.24, $$P_{turb} = W_t c_{p,exh} \eta_{turb} T_{em} \left[1 - \frac{P_{amb}}{P_{em}}\right]^{\frac{\gamma_{exh}-1}{\gamma_{exh}}}. \quad (3.24)$$

TABLE 3.4

Turbine Efficiency constants.

| | |
|---|---|
| $k_1$ | $-5.6245 \times 10^{-4}$ |
| $k_2$ | $2/45\text{-}0 \times 10^{-2}$ |
| $\beta_1$ | $-0.8619$ |
| $\beta_2$ | $-3.7730$ |
| $\beta_3$ | $0.7127$ |
| $\beta_4$ | $-0.9268$ |

$$\dot{N}_{turb} = \frac{P_{turb} - P_{comp}}{I_{turb} N_{turb}}, \quad (3.25)$$

where $I_{turb}$ is the moment of inertia of the turbocharger.

One embodiment includes a physically based, generalizable strategy to estimate the in-cylinder oxygen fraction from production viable measurements or estimates of exhaust oxygen fraction, fresh air flow, charge flow, fuel flow, turbine flow and EGR flow according to one embodiment of the present invention. The oxygen fraction estimates are compared to laboratory grade measurements available for the intake and exhaust manifolds. The oxygen fraction estimates may be sensitive to errors in the EGR and turbine flow. In yet another EGR flow estimate, a high-gain observer is implemented to improve the estimate of EGR flow. Furthermore, the in-cylinder oxygen estimation algorithm is developed, and in some embodiments robust to turbine flow errors. The model observer estimates the oxygen fractions to within 0.5% $O_2$ and is shown to have exponential convergence with a time constant less than 0.05 seconds, even with turbine flow errors of up to 25%. The observer is applicable to engines utilizing high pressure cooled exhaust gas recirculation, variable geometry turbocharging and flexible intake valve actuation, as examples.

The manifold filling dynamics are utilized to derive the oxygen fraction dynamics for the control-oriented model. The oxygen fraction dynamics are shown in Eqs. 4.1 and 4.2, $$\dot{F}_{im} = \frac{RT_{im}}{P_{im}V_{im}}[F_{amb}W_c + F_{em}W_{egr} - F_{im}W_e] \quad (4.1)$$

$$\dot{F}_{em} = \frac{RT_{em}}{P_{em}V_{em}}[F_{eo}(W_e + W_f) - F_{em}W_{egr} - F_{em}W_t]. \quad (4.2)$$

In Eq. 4.1, Wc is the fresh air flow from the turbocharger compressor. Wegr is the EGR flow from the exhaust manifold and is measured on the engine through the use of a calibrated orifice and a delta pressure measurement across the orifice. $W_e$ is the charge flow from the intake manifold into the engine cylinders. $F_{amb}$ is the ambient oxygen fraction and is a function of the humidity level. $F_{im}$ (Fim) is the oxygen fraction in the intake manifold and $F_{em}$ is the oxygen fraction in the exhaust manifold. In Eq. 4.2, $W_t$ is the flow from the exhaust manifold through the turbocharger turbine. $W_f$ is the fuel rate flow into the cylinders. $F_{eo}$ is the oxygen fraction of the gas leaving the cylinder. $F_{eo}$ is calculated based on a chemical balance of diesel fuel ($C_{12}H_{23}$) reacted with the in-cylinder oxygen to major products of $CO_2$, $H_2O$ and $O_2$ as shown in Eq. 4.3, $$F_f C_{12}H_{23} + F_{cyl}O_2 \rightarrow 12F_f CO_2 + \frac{23}{2}F_f H_2O + F_{eo}O_2, \quad (4.3)$$

where $F_{cyl}$ is the trapped oxygen fraction in-cylinder from the incoming charge gas and remaining residual gas, $F_f$ is the molar fuel fraction and $F_{eo}$ is the oxygen fraction after combustion based upon the chemical balance. me is the trapped charge mass and $m_{res}$ is the residual mass due to trapping and back flow from the exhaust manifold. The resulting simplified expression for $F_{eo}$ is shown in Eq. 4.7, $$F_{cyl} = \frac{m_e \cdot F_{im} + m_{res} \cdot F_{em}}{m_e + m_{res}} \quad (4.4)$$

$$m_e = \frac{W_e \cdot 120}{N} \quad (4.5)$$

$$m_{res} = \frac{P_{em} \cdot V_{evc}}{R \cdot T_{em}} \quad (4.6)$$

$$F_{eo} = F_{cyl} - \frac{71}{4}F_f. \quad (4.7)$$

The fresh air flow, $W_c$, is measured using a LFE device as a surrogate for a mass air flow sensor. The charge flow, $W_e$, is calculated using the speed-density equations shown in Eq. 4.8:

$$W_e = \frac{\eta_{vol} \cdot P_{im} \cdot V_d}{R \cdot T_{im}}, \quad (4.8)$$

Vd is the swept displacement of the engine. $P_{im}$ and $T_{im}$ are the measured pressure and temperature in the intake manifold respectively. The physically-based volumetric efficiency model is shown in Eq. 4.9 and is a function of the manifold conditions and the effective compression ratio. In Eq. 4.9, $$\eta_{vol} = \frac{P_{im}\left(\frac{V_{ivc_{eff}}}{V_{ivc}}\right)^k V_{ivc}c_v - P_{em}V_{ivo}c_v - P_{em}(V_{evc} - V_{ivo})c_p}{P_{im}V_d c_p} + \frac{P_{im}(V_{ivc_{eff}} - V_{ivo})R - (h_{ivo-ivc}(T_{wall} - T_{im})SA_{ivo-ivc})R}{P_{im}V_d c_p}, \quad (4.9)$$

Vx is the volume at x where x is a particular crank angle event such as the intake valve closing (ivc), intake valve opening (ivo) or effective intake valve closing (ivc$_{\mathit{eff}}$). cv and cp are the specific heats, R is the gas constant and k is the polytropic compression coefficient. h$_{ivo\text{-}ivc}$ is the heat transfer coefficient, T$_{wall}$ is the cylinder wall temperature and SA$_{ivo\text{-}ivc}$ is the surface area time.

Wf is the fuel rate and can be obtained from the ECM data. The variable geometry turbocharger turbine is modeled using analytical functions based upon turbine maps. Turbine maps generally express turbine speed and mass flow in terms of reduced quantities to account for inlet conditions:

$$W_{t,red} = \frac{W_t \sqrt{T_{em}}}{P_{em}} \tag{4.10}$$

$$N_{turb,red} = \frac{N_{turb}}{\sqrt{T_{em}}}, \tag{4.11}$$

where Tem and Pem are the turbine inlet temperature and pressure.

The turbine flow, Wt, is calculated using the pressure ratio across the turbine, PRt, and the turbocharger shaft speed, Nturb as shown in Eq. 4.12, $$W_t = \pi d_t^2 (\gamma R_{exh})^{\frac{1}{2\gamma}} \left[ b_1 + b_2 \sqrt{\frac{2c_{p,exh}\left(1 - PR_t^{\frac{1-\gamma}{\gamma}}\right)}{\left(\frac{\pi}{60} d_t N_{turb,red}\right)^2}} \right] \times \tag{4.12}$$

$$\frac{(\alpha_1 X_{VGT}^2 + \alpha_2 X_{VGT} + \alpha_3)\left(\frac{\pi}{60} d_t N_{turb,red}\right)^{\frac{2\gamma-1}{\gamma}}}{4R_{exh}\sqrt{2c_{p,exh}\left(1 - PR_t^{\frac{1-\gamma}{\gamma}}\right)}}.$$

Here, R$_{exh}$ and c$_{p;exh}$ are assumed to be constant. The values for b$_i$ and α$_i$, found via least squares, are listed in Table 4.1. Note that the three inputs to Eq. 4.12 are N$_{turb;red}$, PR$_t$ and X$_{VGT}$, and result in reduced mass flow. This reduced mass flow can then be used in Eq. 4.10 to back out actual mass flow through the turbine.

TABLE 4.1

Turbine mass flow constants.

| | |
|---|---|
| b$_1$ | −2.8883 × 10$^{-2}$ |
| b$_2$ | 1.9.18 |
| α$_1$ | −1.2056 |
| α$_2$ | 2.2198 |
| α$_3$ | −1.5203 × 10$^{-2}$ |

An oxygen fraction observer is used in some embodiments based upon the oxygen fraction dynamics shown in Eqs. 4.1 and 4.2. Putting the dynamics into state-space form yields Eq. 4.13. The desired output of the estimator is the in-cylinder oxygen fraction which is directly expressed in Eq. 4.4 and utilizes the states in Eq. 4.13, $$\begin{bmatrix} \dot{F}_{im} \\ \dot{F}_{em} \end{bmatrix} = \begin{bmatrix} -k_{im}W_e & k_{im}W_{egr} \\ 0 & -k_{em}(W_{egr} + W_t) \end{bmatrix} \tag{4.13}$$

$$\begin{bmatrix} F_{im} \\ F_{em} \end{bmatrix} + \begin{bmatrix} k_{im}F_{amb}W_c \\ k_{em}F_{eo}(W_e + W_f) \end{bmatrix}$$

$$z = F_{em} = \begin{bmatrix} 0 & 1 \end{bmatrix} \begin{bmatrix} F_{im} \\ F_{em} \end{bmatrix} \tag{4.14}$$

$$k_{im} = \frac{RT_{im}}{P_{im}V_{im}} = \frac{1}{m_{im}} > 0 \tag{4.15}$$

$$k_{em} = \frac{RT_{em}}{P_{em}V_{em}} = \frac{1}{m_{em}} > 0. \tag{4.16}$$

The equation, z, shown in Eq. 4.14, is selected to be oxygen fraction in the exhaust manifold according to one embodiment of the present invention since Fem is measurable via an UEGO sensor, Fuego, in the exhaust pipe as shown in FIG. 1.3. Equations 4.15 and 4.16 simplify the preceding expressions and physically represent the inverse of the mass trapped in the intake and exhaust manifold, respectively. The system is a linear parameter-varying (LPV) system of the form shown in Eqs. 4.17 and 4.18, $$\dot{g} = A(\rho)g + W(\rho) \tag{4.17}$$

$$\rho = (k_{im}, k_{em}, W_e, W_{egr}, W_t, W_c, W_f, F_{amb}, F_{ea}) \tag{4.18}$$

Many methods exist for designing LPV observers. Due to simplicity and ease of implementation, a Luenberger-like observer strategy was implemented for the in-cylinder oxygen fraction estimator, $$\dot{\hat{g}} = A(\rho)\hat{g} + W(\rho) + L(\rho)(z - \hat{z}) \tag{4.19}$$

$$\hat{g} = \begin{bmatrix} \hat{g}_{im} \\ \hat{g}_{em} \end{bmatrix} = \begin{bmatrix} \hat{F}_{im} \\ \hat{F}_{em} \end{bmatrix} \tag{4.20}$$

$$\hat{F}_{cyl} = \begin{bmatrix} \dfrac{m_e}{m_e + m_{res}} & \dfrac{m_{res}}{m_e + m_{res}} \end{bmatrix} \begin{bmatrix} \hat{F}_{im} \\ \hat{F}_{em} \end{bmatrix}. \tag{4.21}$$

A block schematic of the inputs, states and outputs of the in-cylinder oxygen fraction estimator is shown graphically in FIG. 4.1.

The inputs to the observer include the measured system flow, W$_c$; the calculated system flows, W$_{egr}$, W$_e$, W$_f$ and W$_t$; the calculated in-cylinder masses, me and m$_{res}$; and the UEGO sensor feedback, F$_{uego}$. Table 4.2 lists the source of the parameters utilized in the model.

The estimation error dynamics can be written in a similar manner to the standard form for a Luenberger observer, $$\tilde{g} = g - \hat{g} \tag{4.22}$$

$$\dot{\tilde{g}} = \dot{g} - \dot{\hat{g}} = A(\rho)(g - \hat{g}) - L(\rho)(z - \hat{z}) \tag{4.23}$$

$$\dot{\tilde{g}} = A(\rho)\tilde{g} - L(\rho)C\tilde{g}. \tag{4.24}$$

TABLE 4.2

O2 estimator model parameters

| | |
|---|---|
| $W_c$ | measured with LFE device |
| $W_{egr}$ | calculated by ECM |
| $W_e$ | calculated from Eq. 4.9 |
| $W_f$ | calculated by ECM |
| $W_t$ | calculated from Eq. 4.12 |
| $m_e$ | calculated from Eq. 4.5 |
| $m_{res}$ | calculated from Eq. 4.6 |
| $F_{uego}$ | measured with UEGO sensor in exhaust pipe |

The in-cylinder oxygen fraction is extremely close to the intake manifold oxygen fraction. This is due to the small amount of residual exhaust gas that remains in the cylinder. Therefore, the assumption will be made to neglect the effect of the residual exhaust gas on the in-cylinder oxygen fraction and the intake manifold oxygen fraction can be utilized directly in Eq. 5.24. The intake manifold oxygen fraction dynamics are shown in Eq. 4.1. Dissecting Eq. 4.1, the flows into the intake manifold, $W_e$ and $W_{egr}$, as well as the flow leaving the intake manifold, $W_e$, can be estimated. The control actuators for the gas exchange process include the EGR valve position and the VGT position in some embodiments. However, PCCI combustion modes typically use quantities of EGR resulting in an EGR valve position of 100% under all operating conditions. Therefore, the VGT position can be the controlling actuator for intake manifold oxygen fraction dynamics. The VGT position will directly impact the flow through the turbocharger turbine, $W_t$. The turbine flow can then be utilized to calculate the turbine power, $P_{turb}$, as shown in Eq. 3.24. Applying the steady-state assumption to the turbocharger shaft dynamics shown in Eq. 3.25, the compressor power, $P_{comp}$, can be assumed to be equal to the turbine power, $P_{turb}$ since $P_{turb}$ already contains the mechanical shaft efficiency. The compressor power, $P_{comp}$, can then be utilized to calculate the compressor flow, $W_c$ using Eq. 3.19, thereby defining the relationship between the VGT position and the compressor flow. The manifold filling dynamics show that the effect due to the large volume has a greater effect than the turbocharger shaft speed dynamics in determining the pressure dynamics. To simplify the notation, the following substitutions are made:

$$W_c = k_{comp} P_{comp} \quad (5.25)$$

$$k_{comp} = \frac{\eta_{comp}}{c_{p,amb} T_{amb} \left[ \left( \frac{P_{im}}{P_{amb}} \right)^{\frac{\gamma_{amb}-1}{\gamma_{amb}}} - 1 \right]} \quad (5.26)$$

$$P_{turb} = k_{turb} W_t \quad (5.27)$$

$$k_{turb} = \eta_{turb} c_{p,exh} T_{em} \left[ 1 - \left( \frac{P_{amb}}{P_{em}} \right)^{\frac{\gamma_{exh}-1}{\gamma_{exh}}} \right] \quad (5.28)$$

$$W_c = k_{comp} k_{turb} W_t \quad (5.29)$$

$$k_{F_{im}} = \frac{R_{im} T_{im}}{P_{im} V_{im}}. \quad (5.30)$$

The $W_{egr}$ term in Eq. 4.1 will be treated as a disturbance to the system since the main control actuator, the EGR valve position, is saturated at its maximum position in some embodiments. The intake manifold oxygen fraction dynamics are now cast into a state-space equivalent form in Eq. 5.31, $$\dot{F}_{im} = k_{F_{im}} F_{amb} k_{comp} k_{turb} W_t + k_{F_{im}} F_{em} W_{egr} - k_{F_{im}} F_{im} W_c. \quad (5.31)$$

Equation 5.31 can be expressed as a linear parameter varying form as shown in Eq. 5.32.

$$\dot{x} = A(\rho)x + B(\rho)u + G(\rho) \quad (5.32)$$

$$A(\rho) = -k_{F_{im}} W_e \quad (5.33)$$

$$B(\rho) = k_{F_{im}} F_{amb} k_{comp} k_{turb} \quad (5.34)$$

$$G(\rho) = k_{F_{im}} F_{em} W_{egr} \quad (5.35)$$

$$x = F_{im} \quad (5.36)$$

$$u = W_t \quad (5.37)$$

where the system parameters are expressed in p and the input u is the turbine flow, $W_t$, that is directly controllable by adjusting the VGT position. However, yet other embodiments contemplate control of the EGR valve position in order to modulate EGR flow over a range of flows.

With the system dynamics defined, a control law may be selected to stabilize the system and provide reference tracking to the desired $F_{im}$ values. The selected control law is shown in Eq. 5.38, $$u = K(r_f - x) + L, \quad (5.38)$$

where $r_f$ is the filtered version of the $F_{im}$ reference command, r, after it is filtered by the system dynamics as shown in Eq. 5.39, $$\dot{r}_f = A r_f - A r \quad (5.39)$$

$$\dot{r}_f = -k_{F_{im}} W_e r_f + k_{F_{im}} W_e r. \quad (5.40)$$

Substitution of the control law in Eq. 5.38 into the system dynamic equation, Eq. 5.31 yields the closed-loop expression shown in Eq. 5.41.

$$\dot{x} = Ax + B[K(r_f - x) + L] + G. \quad (5.41)$$

With the control law selected for the slower gas exchange dynamics, fixing the values of $\chi_{O2}$, $\overline{P}$ and $\overline{T}$, the ECM-commanded SOI can be determined based upon the engine speed and the desired SOC. $SOI_{ecm}$ is calculated using Eq. 5.42, $$SOI_{ecm} = SOC - 1.2 - 0.0018N - 0.006N \\ (0.051 \chi_{O_2}^{-1.14} \overline{P}^{-0.51} e^{(2100/\overline{T})}), \quad (5.42)$$

where $\chi_{O2}$ is the estimated $F_{im}$.

A high level graphical representation of the controller structure according to one embodiment of the present invention is shown in FIG. 5.11. FIG. 5.12 shows the controller structure and includes the additional models and estimators utilized in the control.

FIG. 3 shows the controller operating at an engine speed of 1600 rpm and an engine torque of 140 ft-lb. The desired SOC was fixed at −5 deg ATDC and the $F_{im}$ command was stepped from 20% oxygen to 16% oxygen.

Figure 3A:
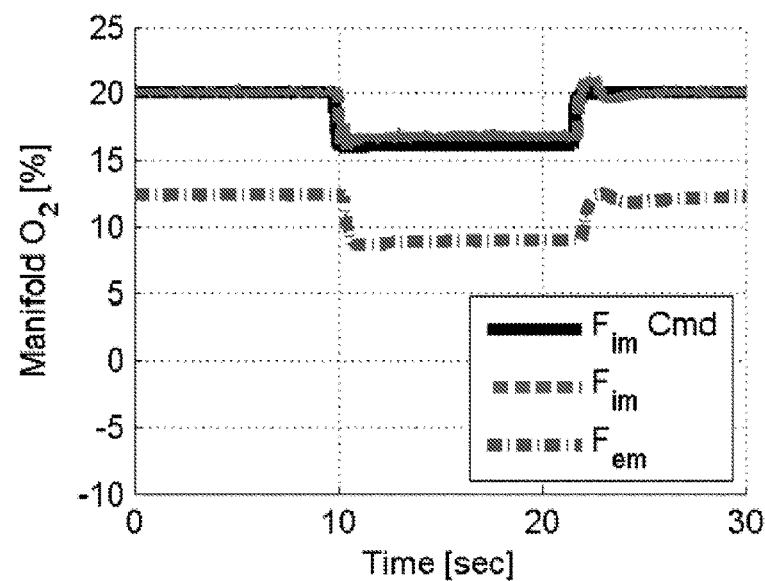
FIG. 3 are graphical representations of data PCCI combustion timing controller, SOC=−5, $F_{im}$ steps, IVC=565 at 1600 rpm and 140 ft-lbf, including plots of: (a) manifold oxygen percentage, (b) actuator position, (c) start of combustion, and (d) flow, all as a function of time.

In FIG. 3A, the plot shows the oxygen fraction in both the intake and exhaust manifolds. The solid black line is the reference filtered commanded intake manifold oxygen fraction. The single dashed red line is the estimated intake manifold oxygen fraction and the blue double dashed dot line is the measured exhaust oxygen fraction. The manifold oxygen fraction plot shows the step change in the desired intake manifold oxygen fraction and the estimated intake manifold oxygen fraction tracking the reference command. The estimated value of $F_{im}$ tracks the desired oxygen fraction to within 1% oxygen as desired. FIG. 3C shows the desired SOC in a solid black line. The single dashed red line is the measured SOC based upon the in-cylinder pressure trace and the blue double dashed dot line is the commanded SOI. FIG. 3C shows the SOC being controlled to the desired SOC to within 1 crank angle degree (CAD) while the $F_{im}$ is being step changed. The commanded SOI is adjusted by the controller to compensate for the change in $F_{im}$ as evidenced by examining the SOI command during the $F_{im}$ step changes.

Figure 3B:
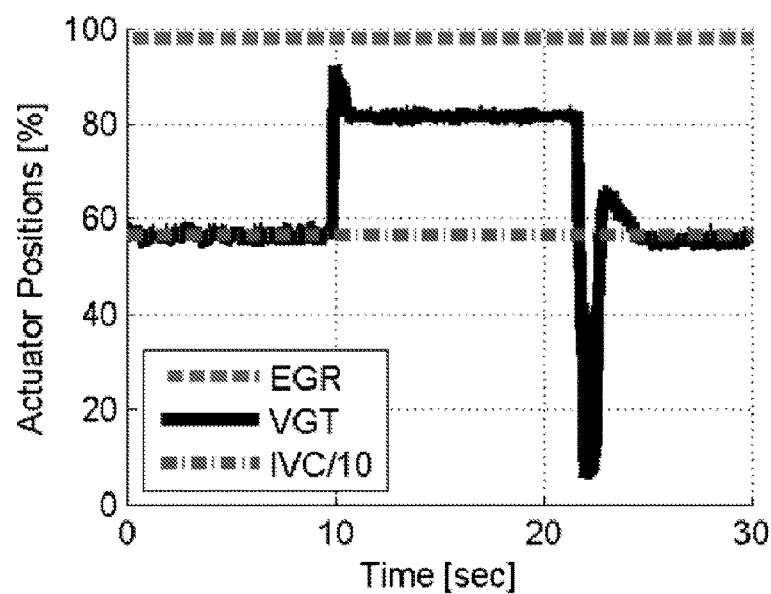
Figure 3C:
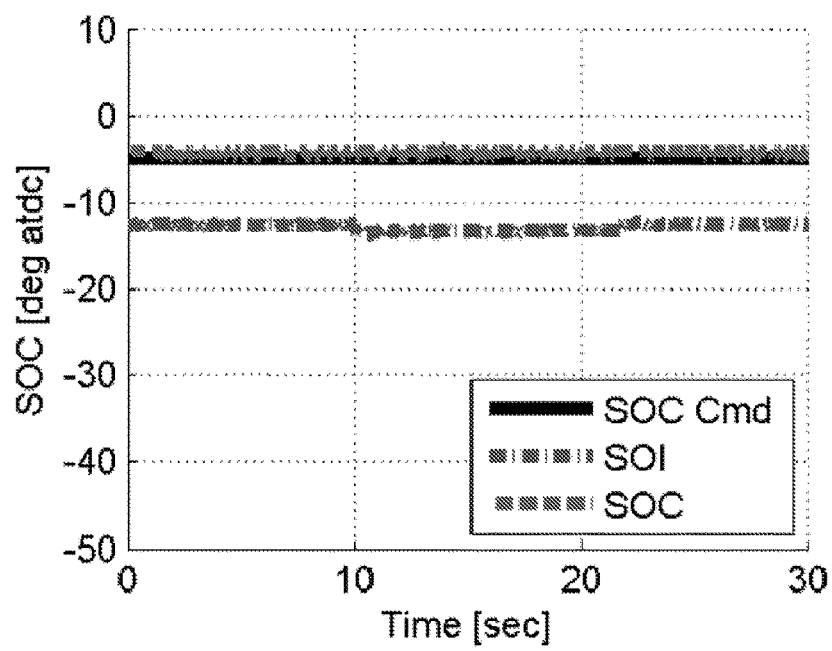
Figure 3D:
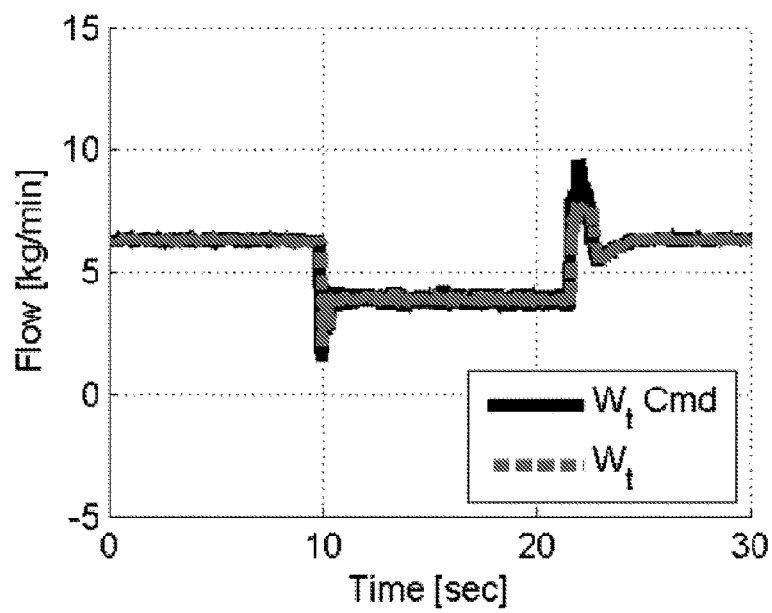

FIG. 3B shows the gas exchange actuator positions. The VGT position is shown in a solid black line. The VGT position is adjusted to control the estimated $F_{im}$ to the desired $F_{im}$. The EGR valve position is shown in dashed red line at 100% open. The IVC timing is shown in a blue dash dot line and is fixed at 565 deg ATDC. FIG. 3D shows the commanded turbine flow in a solid black line. The single dashed line shows the actual turbine flow as calculated by turbocharger analytical functions. The calculated turbine flow is controlled to the commanded turbine flow by adjusting the VGT position. A larger VGT position, reported in percent closed, allows less flow to pass through the turbine when compared to a smaller VGT position, allowing the turbine flow to be controlled through adjustment of the VGT position.

FIG. 4 shows the controller operating at an engine speed of 1600 rpm and an engine torque of 140 ft-lb. The desired SOC was stepped and the $F_{im}$ command was held constant at 18% oxygen.

Figure 4A:
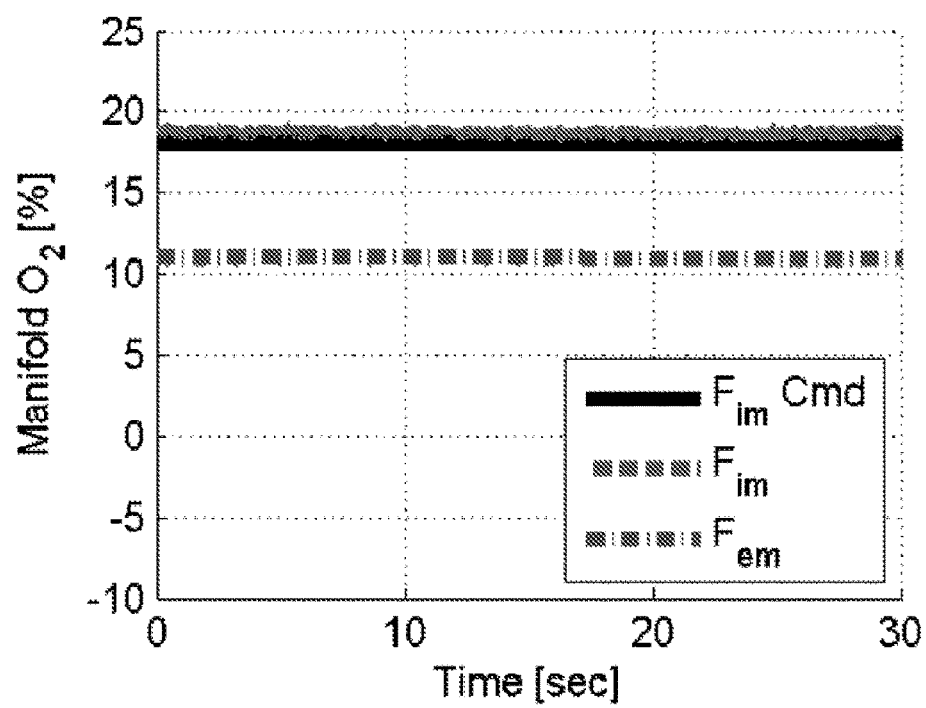
FIG. 4.1 is a schematic representation of an $0_2$ estimator model inputs, states and outputs, according to one embodiment of the present invention.
Figure 4B:
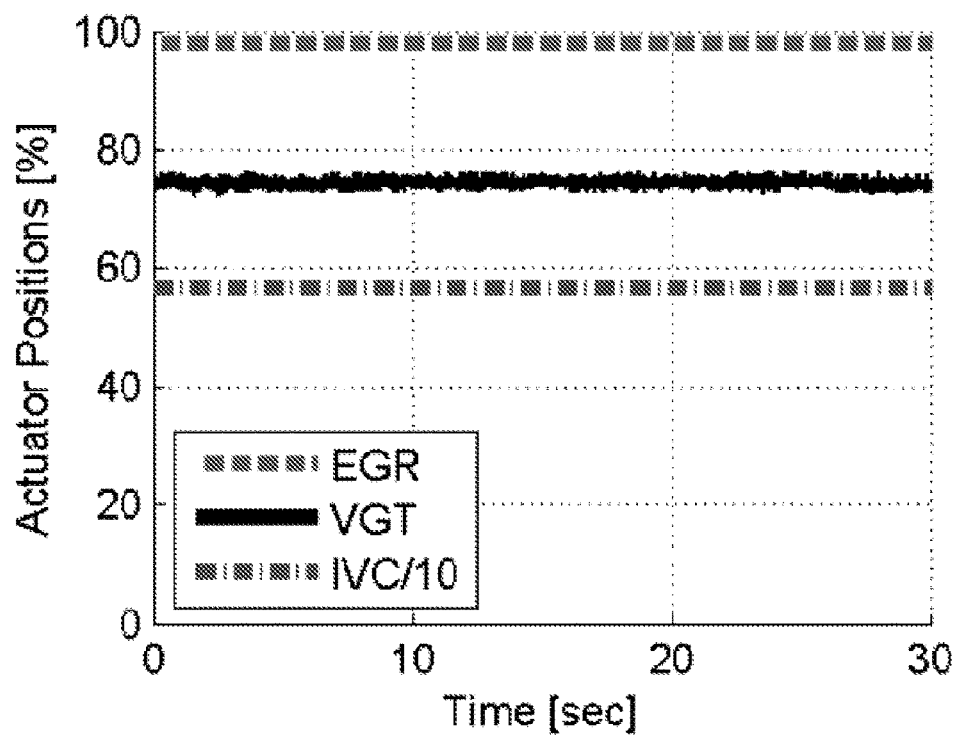
Figure 4C:
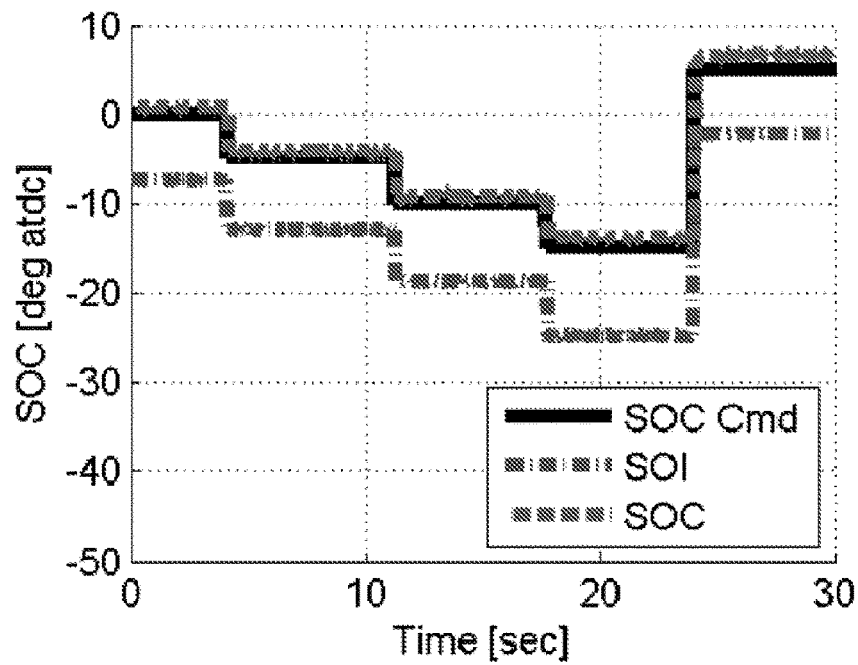
Figure 4D:
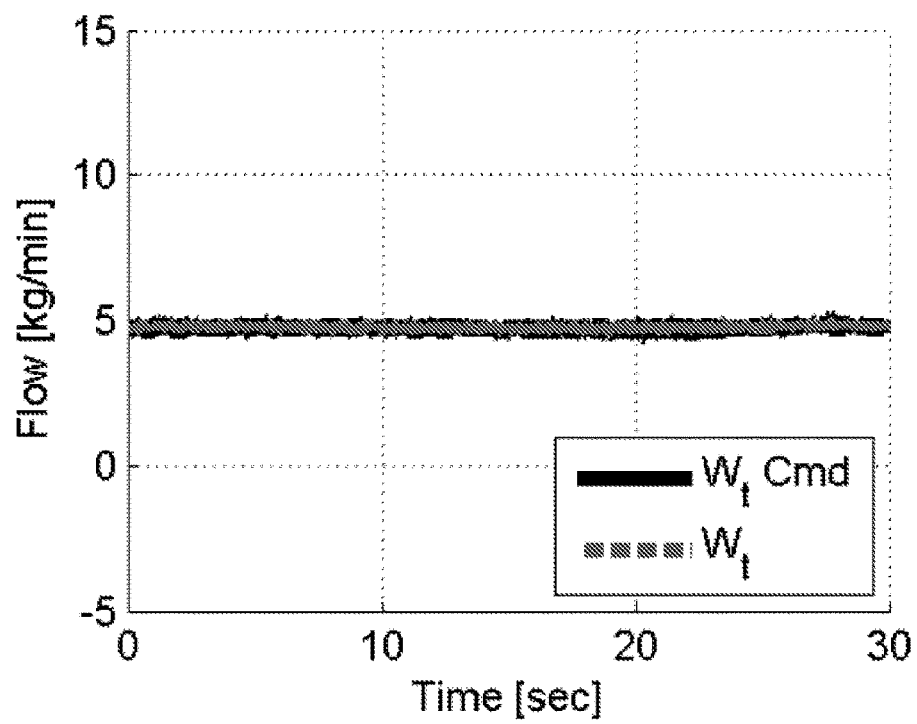

In FIG. 4A, the manifold oxygen fraction plot shows the desired intake manifold oxygen fraction and the estimated intake manifold oxygen fraction tracking the reference command. The estimated value of $F_{im}$ tracks the desired oxygen fraction. FIG. 4C shows the SOC being controlled to the desired stepped SOC while the $F_{im}$ is held constant. The commanded SOI, shown in blue dash dot, is adjusted to compensate for the change in desired SOC. FIG. 4B shows the VGT position being adjusted to control the estimated $F_{im}$ to the desired $F_{im}$. The EGR valve position is shown in dashed red line at 100% open. The IVC timing is shown in a blue dash dot line and is fixed at 565 deg ATDC. FIG. 4D shows the actual turbine flow is controlled to the commanded turbine flow by adjusting the VGT position.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

The invention claimed is:

1. A method of operating a charge compression ignition internal combustion engine, comprising:
    operating diesel engine having at least one cylinder including a reciprocating piston coupled to a rotating crankshaft, an intake manifold for providing ambient air through a variable intake valve actuation system, a fuel injector for injecting fuel into the cylinder; an exhaust gas recirculation system providing recirculated exhaust gas to the intake manifold, and an electronic controller operably connected to the exhaust gas recirculation system, to the valve actuation system, and to fuel injector;
    inducting a charge into the cylinder from the intake manifold of ambient air through the variable intake valve actuation system and recirculated exhaust gas;
    determining a quantity of free oxygen in the charge; and
    varying the flow characteristics of the variable intake valve actuation system in response to the quantity of free oxygen in the charge to achieve a predetermined quantity of oxygen in the cylinder.

2. The method of claim 1 wherein said engine includes a turbocharger, the electronic controller includes data corresponding to turbocharger performance, and said determining includes estimating the quantity of free oxygen in response to the turbocharger data.

3. The method of claim 1 wherein the electronic controller includes data corresponding to volumetric efficiency of the intake manifold and said determining includes estimating the quantity of free oxygen in response to the intake manifold data.

4. The method of claim 1 wherein the electronic controller includes data corresponding to the flow characteristics of the EGR system and said determining includes estimating the quantity of free oxygen in the charge in response to the EGR data.

5. The method of claim 1 wherein the EGR system includes an EGR valve having a range of electronically actuatable exhaust flow characteristics and said varying includes varying the flow characteristics of the exhaust gas recirculation system by actuating the EGR valve.

6. The method of claim 1 wherein said engine includes a turbocharger having a turbine driven by gases combusted in the cylinder and the turbine includes electronically actuatable variable geometry, and said varying includes varying the flow characteristics of the exhaust gas recirculation system by actuating the variable geometry.

7. The method of claim 1 wherein said varying the flow characteristics of the variable intake valve actuation system is by changing the opening time of at least one intake valve.

8. The method of claim 1 wherein said varying the flow characteristics of the variable intake valve actuation system is by changing the peak lift of at least one intake valve.

9. The method of claim 1 wherein said varying the flow characteristics of the variable valve actuation system is by changing the closing time of at least one intake valve.

10. The method of claim 1 wherein said determining includes calculating the effective compression ratio of the charge.

11. The method of claim 1 wherein said engine includes an exhaust valve providing a flowpath for the mixture out of the cylinder and at least one intake valve of the variable intake valve actuation system is substantially open prior to the closing of the exhaust valve.

12. The method of claim 1 wherein the variable intake valve actuation system includes an intake manifold pressure sensor providing a signal to the controller corresponding to the pressure, and wherein said determining includes estimating the quantity of free oxygen in response to a term derived from the signal.

13. The method of claim 1 wherein the exhaust system includes an exhaust manifold pressure sensor providing a signal to the controller corresponding to the pressure, and wherein said determining includes estimating the quantity of free oxygen in response to a term derived from the signal.

14. The method of claim 1 which further comprises injecting fuel into the cylinder during said inducting.

15. The method of claim 14 which further comprises compressing the charge in the cylinder and combusting the fuel in the cylinder by said compressing.

16. The method of claim 1, wherein the electronic controller includes data corresponding to the predetermined quantity of oxygen in the cylinder and said determining the quantity of free oxygen includes estimating the quantity of free oxygen with the electronic controller.

17. The method of claim 7 wherein the variable intake valve actuation system includes an intake manifold pressure sensor providing a signal to the controller corresponding to the pressure, and wherein said determining includes estimating the quantity of free oxygen in response to a term derived from the signal.

18. The method of claim 17 wherein the exhaust system includes an exhaust manifold pressure sensor providing a signal to the controller corresponding to the pressure, and wherein said determining includes estimating the quantity of free oxygen in response to a term derived from the signal.

19. The method of claim 7 which further comprises injecting fuel into the cylinder during said inducting.

20. The method of claim 8 wherein the variable intake valve actuation system includes an intake manifold pressure sensor providing a signal to the controller corresponding to the pressure, and wherein said determining includes estimating the quantity of free oxygen in response to a term derived from the signal.

21. The method of claim 20 wherein the exhaust system includes an exhaust manifold pressure sensor providing a signal to the controller corresponding to the pressure, and wherein said determining includes estimating the quantity of free oxygen in response to a term derived from the signal.

22. The method of claim 21 which further comprises injecting fuel into the cylinder during said inducting.

23. The method of claim 9 which further comprises injecting fuel into the cylinder during said inducting.

24. The method of claim 9 wherein the variable intake valve actuation system includes an intake manifold pressure sensor providing a signal to the controller corresponding to the pressure, and wherein said determining includes estimating the quantity of free oxygen in response to a term derived from the signal.

25. The method of claim 9 wherein the exhaust system includes an exhaust manifold pressure sensor providing a signal to the controller corresponding to the pressure, and wherein said determining includes estimating the quantity of free oxygen in response to a term derived from the signal.

26. The method of claim 7 wherein said varying the flow characteristics of the variable intake valve actuation system further includes changing the peak lift of at least one intake valve.

27. The method of claim 7 wherein said varying the flow characteristics of the variable valve actuation system further includes changing the closing time of at least one intake valve.

28. The method of claim 1, comprising:
operating an engine having at least one cylinder including a reciprocating piston coupled to a rotating crankshaft, an exhaust gas recirculation system, a fuel injector, and an electronic controller operably connected to the EGR system and to the fuel injector;
inducting a charge into the cylinder of ambient air and recirculated exhaust gas from the EGR system;
compressing the charge in the cylinder;
determining a delay from the injection of fuel into the compressed charge to the start of combustion of the injected fuel in response to a predetermined start of combustion; and
injecting fuel into the cylinder to achieve the predetermined start of combustion.

29. The method of claim 28 wherein said determining includes estimating an ignition delay associated with combustion of the charge.

30. The method of claim 29 wherein said estimating is with an Arrhenius-type relationship.

31. The method of claim 30 wherein the Arrhenius-type relationship includes a term corresponding to the amount of oxygen in the charge.

32. The method of claim 28 wherein said determining includes estimating the amount of free oxygen in the cylinder.

33. The method of claim 32 which further comprises actuating the EGR system and changing the amount of oxygen in the cylinder in response to said determining.

34. The method of claim 28 wherein said engine includes a turbocharger having a turbine including electronically actuatable variable geometry and driven by gases combusted in the cylinder and a compressor providing pressurized ambient air to the cylinder, and which further comprises actuating the variable geometry and changing the crank angle at which the charge begins compression ignition.

35. The method of claim 28 wherein said engine includes a turbocharger having a turbine including electronically actuatable variable geometry and said determining includes estimating the pressure of the engine exhaust.

36. The method of claim 35 wherein said estimating the pressure of the exhaust is with data corresponding to the turbine characteristics.

37. The method of claim 28 which further comprises directly injecting fuel into the cylinder during said compressing and before the start of compression ignition.

38. The method of claim 28 wherein the intake system includes an intake valve for said cylinder having flexible valve timing.

39. The method of claim 28, wherein the electronic controller includes data corresponding to the predetermined start of combustion and the delay is calculated by the electronic controller.

* * * * *